(12) United States Patent
Okada et al.

(10) Patent No.: US 6,792,213 B1
(45) Date of Patent: Sep. 14, 2004

(54) OPTICAL SIGNAL TRANSMITTING APPARATUS, OPTICAL DATA BUS SYSTEM AND SIGNAL PROCESSING APPARATUS

(75) Inventors: Junji Okada, Nakai-machi (JP); Shinya Kyozuka, Nakai-machi (JP); Hidenori Yamada, Nakai-machi (JP); Tsutomu Hamada, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 667 days.

(21) Appl. No.: 09/655,426

(22) Filed: Sep. 5, 2000

(30) Foreign Application Priority Data

| Sep. 8, 1999 | (JP) | 11-254057 |
| Jun. 5, 2000 | (JP) | 2000-167948 |
| Jun. 6, 2000 | (JP) | 2000-168955 |
| Jun. 14, 2000 | (JP) | 2000-179021 |
| Aug. 23, 2000 | (JP) | 2000-252661 |

(51) Int. Cl.[7] .................. H04B 10/12; H04B 10/00; G02B 6/26; G02B 6/42; G02B 6/10
(52) U.S. Cl. ............... 398/142; 398/139; 398/141; 398/164; 385/15; 385/31; 385/146
(58) Field of Search ................ 398/141, 142, 398/164, 139; 385/15, 31, 146, 901

(56) References Cited

U.S. PATENT DOCUMENTS

| 4,172,631 A | * 10/1979 | Yevick ............... 385/115 |
| 4,213,670 A | 7/1980 | Milton et al. ........... 350/96.16 |
| 4,722,586 A | * 2/1988 | Dodson et al. ............. 385/92 |
| 4,850,044 A | 7/1989 | Block et al. ............... 455/607 |
| 4,911,765 A | * 3/1990 | Song et al. ............... 148/33.4 |
| 5,799,126 A | * 8/1998 | Nagatani et al. ........... 385/146 |
| 5,822,475 A | 10/1998 | Hirota et al. .............. 385/24 |
| 5,850,290 A | * 12/1998 | Horiguchi et al. ......... 356/602 |
| 6,341,027 B1 | * 1/2002 | Tatsuno et al. ........... 398/164 |

FOREIGN PATENT DOCUMENTS

| JP | 58-42333 | 3/1983 |
| JP | 61-196210 | 8/1986 |
| JP | 63-1223 | 1/1988 |
| JP | 2-41042 | 2/1990 |
| JP | 4-134415 | 5/1992 |
| JP | 11-41172 | 2/1999 |

OTHER PUBLICATIONS

Uchida, The 9th Science Lecture Meeting of Circuit Packaging Technology, 15C01, pp. 201–202.
Tomimuro et al., IEEE Tokyo Section, Denshi, Tokyo No. 33, 1994, pp. 81–86.
Li et al., IEEE Photonics Technology Letters, vol., 8, No. 12, Dec. 1996, pp. 1650–1652.

* cited by examiner

*Primary Examiner*—M. R. Sedighian
(74) *Attorney, Agent, or Firm*—Oliff & Berridge, PLC

(57) ABSTRACT

The utilization efficiency of light is to be enhanced. Optical signals are brought to incidence on incidence/emission portions provided on the end face of a light transmitting medium where a reflective optical diffusion layer is arranged. The incident optical signals, upon reaching the reflective optical diffusion layer, are diffusively reflected in both vertical and lateral directions. Of the diffused light, not only the part of it coming directly incident on each of the plural incidence/emission portions formed on the end face of the light transmitting medium but also the rest propagates while being reflected by sides of the light transmitting medium and is emitted from the plural incidence/emission portions.

17 Claims, 29 Drawing Sheets

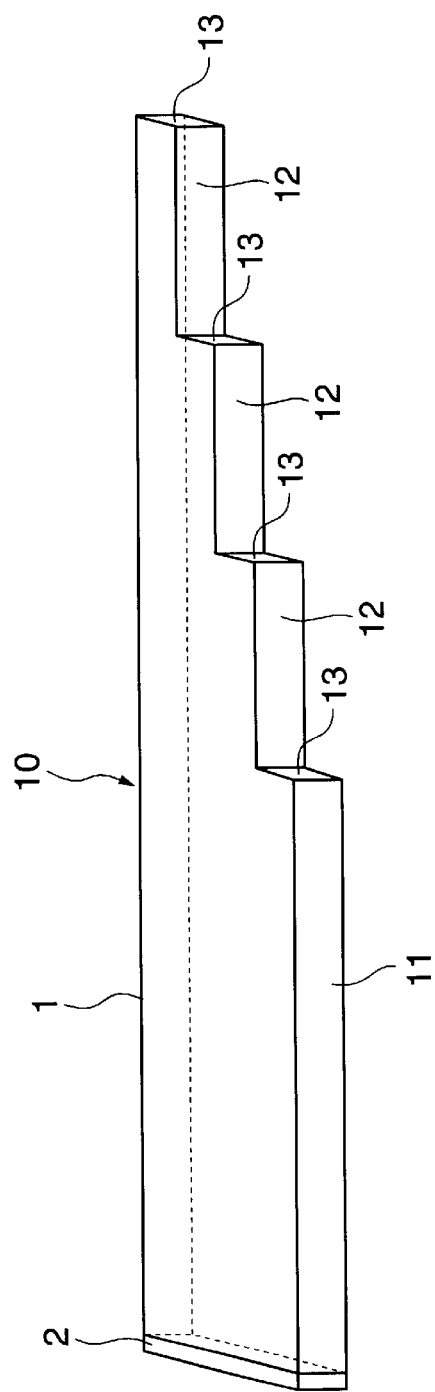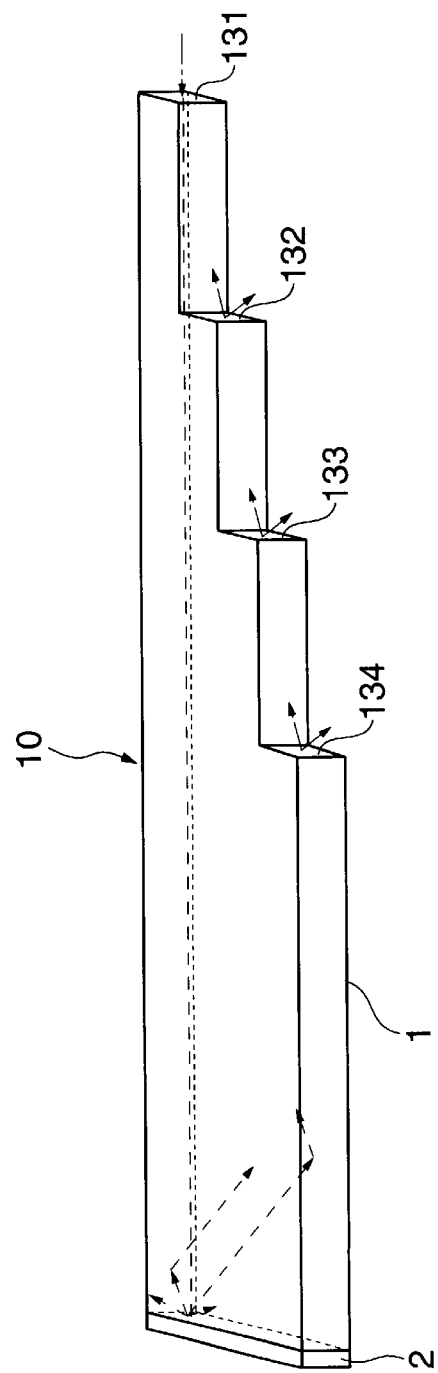

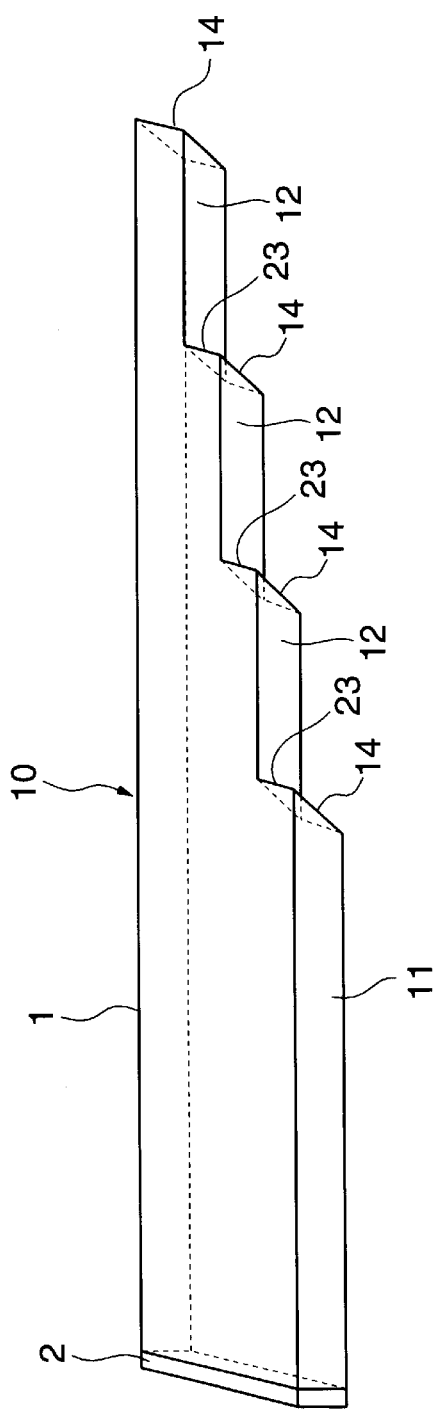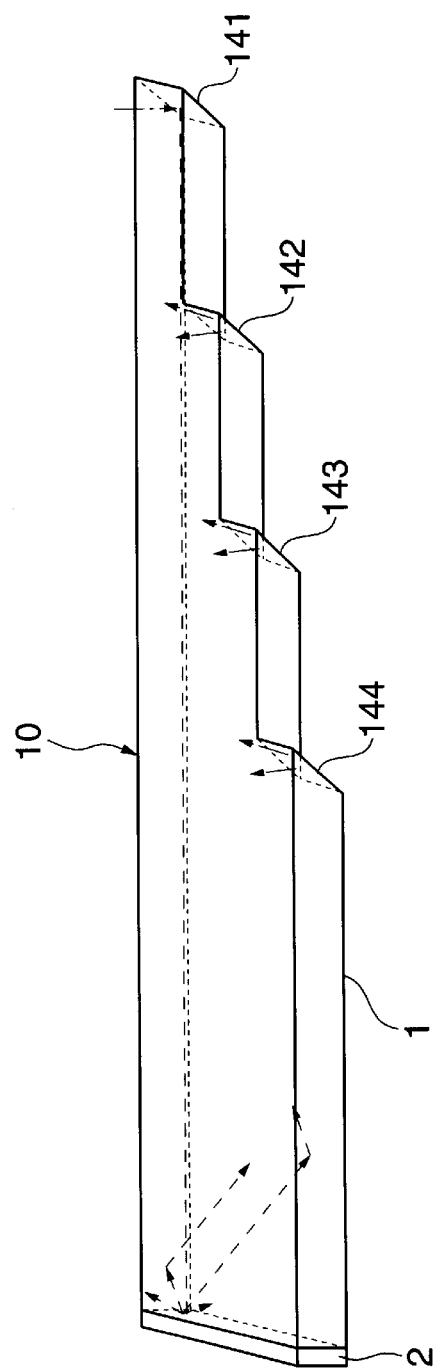
FIG.2A
FIG.2B

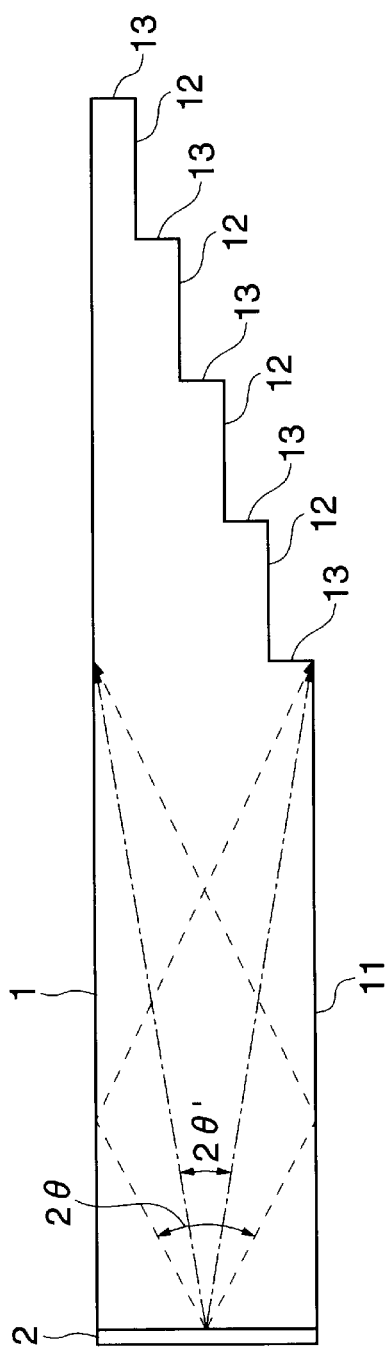
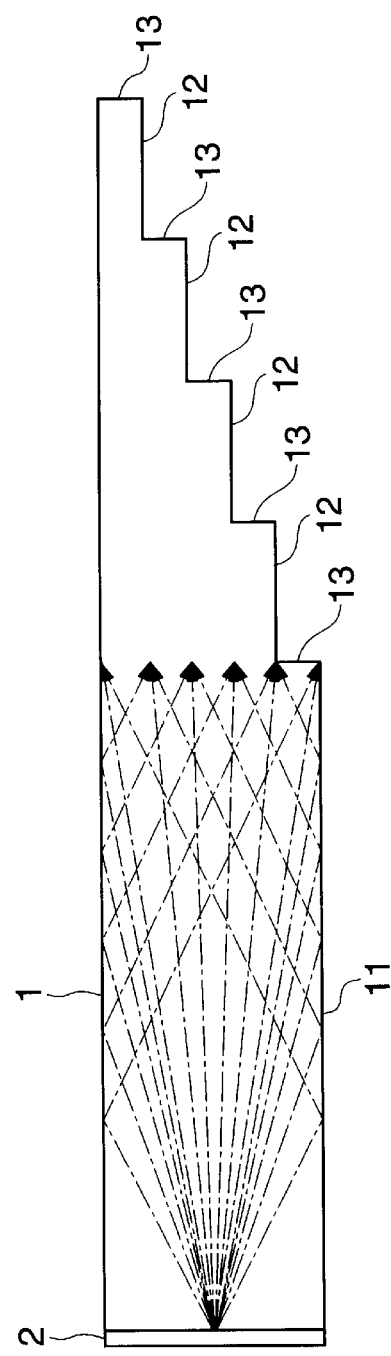
FIG.11A
FIG.11B

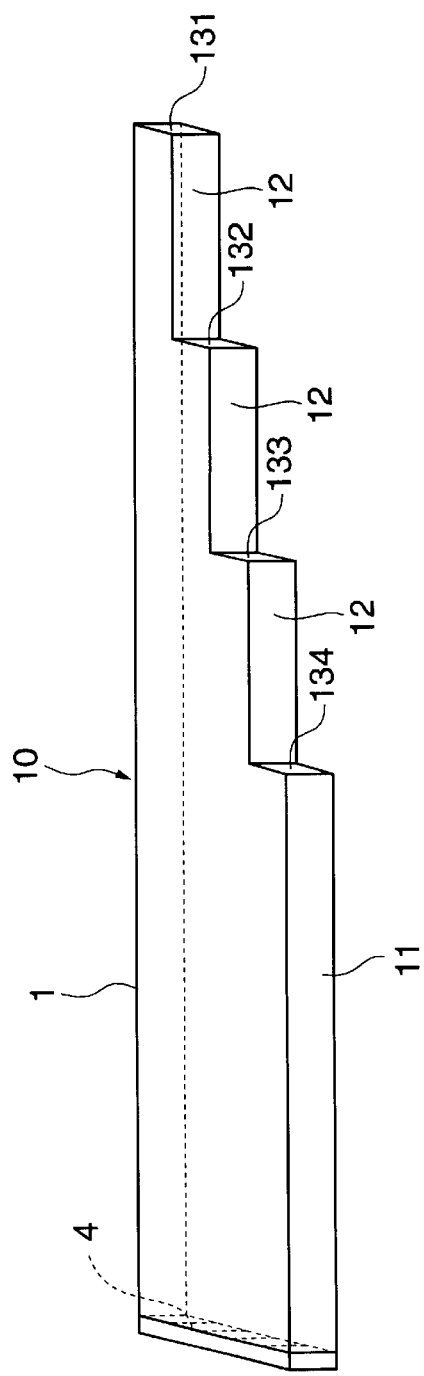
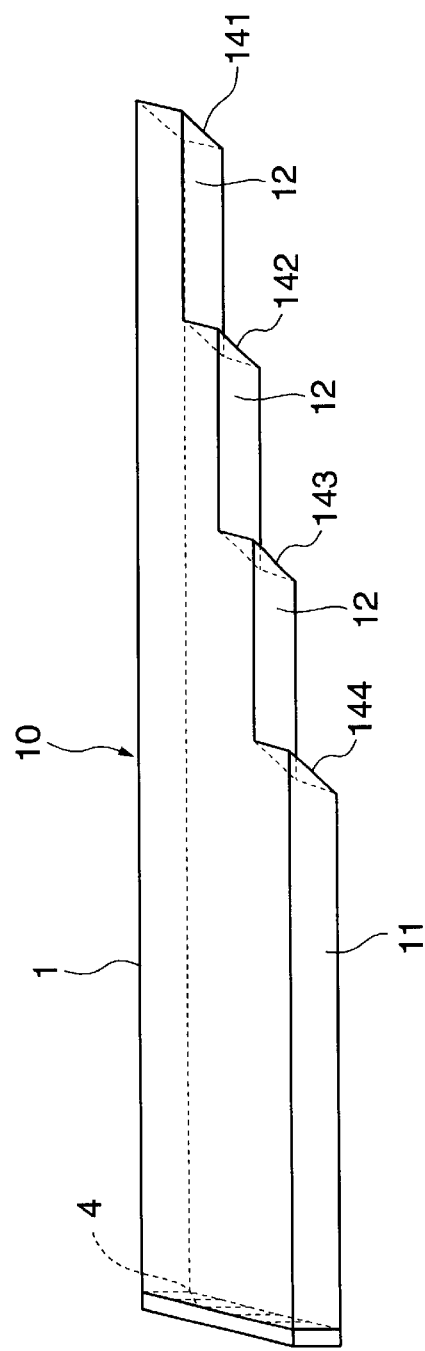
FIG.12A
FIG.12B

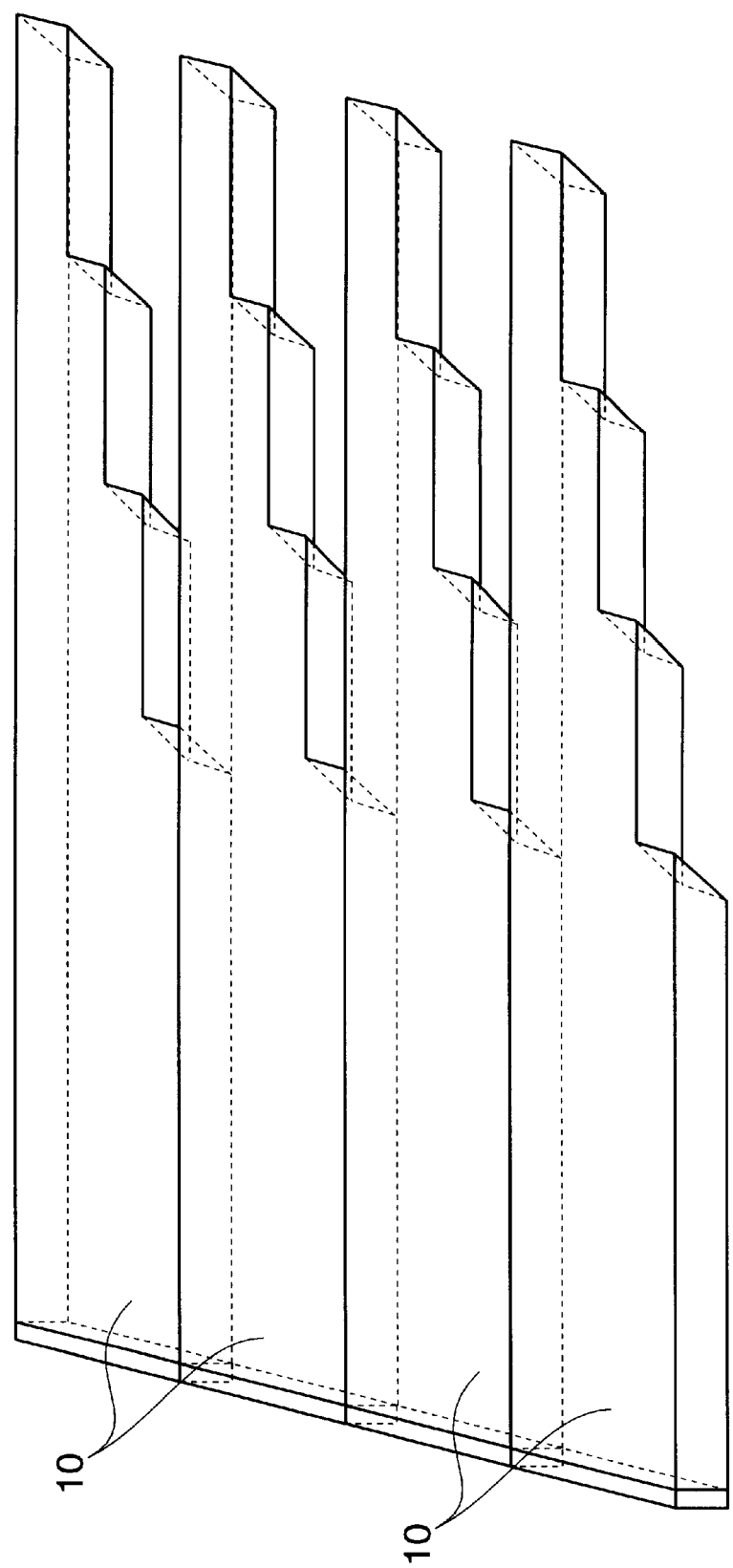

OPTICAL SIGNAL TRANSMITTING APPARATUS, OPTICAL DATA BUS SYSTEM AND SIGNAL PROCESSING APPARATUS

BACKGROUND OF THE INVENTION

1. Field of the Invention

The present invention relates to an optical signal transmitting apparatus, an optical data bus system and a signal processing apparatus, and more particularly to an optical signal transmitting apparatus for emitting incident optical signals in a plurally branched state, an optical data bus system using the optical signal transmitting apparatus, and a signal processing apparatus using the optical data bus system.

2. Description of the Related Art

As a result of very large scale integrated (VLSI) circuits, the range of circuit functions of daughter boards for use in a data processing system has substantially expanded. As the number of signals connected to each daughter board increases along with the increase in circuit functions, a parallel architecture requiring many connectors and connecting lines is adopted for the data bus board (mother board) for connecting the daughter boards in a bus structure. While the operating speed of the parallel bus has been enhanced by the use of multiple layers of fine connection lines in the parallel architecture, the processing speed of the system is sometimes limited by the operating speed of the parallel bus as a consequence of signal delays due to inter-wiring capacitance and the resistance of connection wiring. Also the problem of electromagnetic interference (EMI) due to the increased density of parallel bus wiring also poses a severe constraint to the enhancement of system processing speed.

In order to solve these problems and enhance the operating speed of the parallel bus, possible use of an intra-system optical connection technique known as optical interconnection is being studied. Various forms of optical interconnection, as its outlines described by Uchida, the Scientific Lecture Convention on Circuit Packaging 15C01, pp. 201–202(in Japanese) and H. Tomimuro et al, IEEE Tokyo Section Denshi Tokyo No. 33, pp. 81–86 (1994) reveal, are proposed, differing with the configuration of the system.

Of the various forms of optical interconnection technique so far proposed, an optical data transmission formula using a light emitting/receiving device is disclosed in Japanese Published Unexamined Patent Application No. Hei 2-41042. This patent application proposes a serial data bus for loop transmission among daughter boards in which light emitting/receiving devices are disposed on the top and bottom sides of each daughter board, and the light emitting/receiving device on adjoining daughter boards incorporated into a system frame are spatially coupled by light. According to this formula, an optical signal sent from any one daughter board is opto-electrically converted in an adjoining daughter board, on which the signal is further electro-optically converted to send the resultant optical signal to the next adjoining daughter board, so that the daughter boards are successively arranged in series and the signal is transmitted to every daughter board built into the system frame while repeating opto-electric and electro-optical conversions. As a result, the speed of signal transmission both depends on and is limited by the speed of opto-electric or electro-optical conversion of the light receiving/emitting device arranged on each daughter board. Furthermore, since data transmission between daughter boards uses optical coupling, in which free space intervenes, by the light receiving/emitting devices arranged on the daughter boards, interference between adjoining optical data transmission paths (cross talk) is likely to arise and invite faulty transmission of data. Faulty transmission of data may also arise from some environmental factor in the system frame, for instance the scattering of optical signals by dust or the like.

Japanese Published Unexamined Patent Application No. Sho 61-196210 proposes a formula by which daughter boards are coupled via an optical path including diffraction gratings and reflective elements arranged over the surface of a plate. According to this formula, since light emitted from one point can be connected to only one fixed point, it is impossible to comprehensively connect all the daughter boards as an electric bus does.

Also, a number of patents have been applied for regarding data transmission between daughter boards using an optical connecting device equipped with a branching element.

Japanese Published Unexamined Patent Application No. Sho 58-42333 discloses an instance of data transmission between daughter boards using plural half mirrors. However, where plural half mirrors are used, the overall hardware size tends to become large, and each mirror should be coordinated in optical position relative to the pertinent light emitting/receiving device. Moreover, since transmitted light having passed a half mirror is approximately halved in optical intensity compared with the incident light, repetition of branching and transmission more than once substantially weakens the optical intensity with the consequence that the light receiving device can obtain no sufficient light intensity and signal transmission is thereby made impossible.

Japanese Published Unexamined Patent Application No. Hei 4-134415 reveals a formula by which an optical signal is brought to incidence on a side of lens array in which plural lenses are formed and each lens emits the signal. According to this formula, the closer a lens is to the incident position of light, the greater the luminous energy emitted from the lens, and this may result in intensity fluctuations of the emitted signal depending on the positional relationship between incidence and emission. Furthermore, the utilization efficiency of the incident luminous energy is low because a considerable proportion of the light coming incidence from one side escapes from the opposite side.

There is also an optical bus formula using an optical fiber, as disclosed in Japanese Published Unexamined Patent Application No. Sho 63-1223, by which substantially uniform optical signals can be transmitted by successively increasing the ratio of branching from the input end onward. A method for forming a coupler adaptable to such a formula is described in the IEEE Photonics Technology Letters, Vol. 8, No. 12, December (1996)p1650. The coupler forming method described therein achieves branching with a V groove formed in the optical fiber. Conceivably, by adjusting the size of the V groove, the output luminous energy may be adjusted, but it is extremely difficult to produce such an arrangement, and utilization of the incident luminous efficiency would be inadequate, too.

Further, a star coupler for uniformizing the intensities of branched optical signals is disclosed in the Japanese Published Unexamined Patent Application No. Hei 9-184941. This star coupler schematically has plural optical fibers of which the ends on one side are bundled and fixed, and an optical waveguide large enough to cover the plural optical fibers brought into contact with one end face of the bundle, of which the other end face is provided with an optical reflector.

Where such a coupler is used for data transmission between daughter boards, an increase in the number of boards would result in a corresponding increase in the number of the fibers to be connected to a light receiving/emitting element, inviting a greater complexity of configuration and a consequent larger size of hardware.

SUMMARY OF THE INVENTION

The present invention, attempted in view of the above-described circumstances, is intended to provide an optical signal transmitting apparatus permitting easy laying out of connecting boards, an optical data bus system using more than one such optical signal transmitting apparatus, and a signal processing apparatus using that optical data bus to carry out signal processing including transmission and reception of data.

To achieve this intention, according to the invention, there are provided a light transmitting medium having plural level gaps at one end of the light transmitting medium, in which the plural level gaps correspond to plural incidence/emission portion and an optical signal is incident on and/or emitted from the plural incidence/emission portions, and a reflector arranged at the other end of the light transmitting medium which reflects the optical signal being incident from the incidence/emission portion toward the plural the incidence/emission portions.

Thus, by disposing plural level gaps at one end of the light transmitting medium, plural level gaps are corresponded to the incidence/emission portions. Preferably, the incidence/emission portions are formed by disposing stepwise plural level gaps at one end of the light transmitting medium. At the other end of the light transmitting medium, the reflector is provided to reflect optical signal being incident from the incidence/emission portion toward the plural the incidence/emission portions.

Therefore, if an optical signal is incident through one of the plural the incidence/emission portions, the optical signal is transmitted through the light transmitting medium and reaches the reflector. The optical signal having reached the reflector is reflected toward the incidence/emission portion.

Thus, as the light transmitting medium is so that the incidence/emission portions have level gaps, where light emission/receiving element is to be arranged to face the incidence/emission portion, if the light emission/receiving element is provided on a daughter board, the daughter boards can be installed side by side, resulting in a simplified layout.

It is desirable to configure a side of the light transmitting medium to reflect part of the optical signal so as to guide to the incidence/emission portions, because the utilization efficiency of light can be enhanced.

The length of each of the plural level gaps formed on one end of the light transmitting medium here may as well be made equal to the others. Or else the light transmitting medium may be provided with the plural level gaps so as to satisfy the condition of $L2 \geq L1$, where $L1$ is the length of each of the plural level gaps and $L2$ is the distance from the other end of the light transmitting medium to the incidence/emission portions positioned closest to that other end.

Also, the incidence/emission portions of the light transmitting medium may reflect the incident optical signals toward the reflector and reflect the optical signals reflected by the reflector and by the side in the direction reverse to the direction of incidence. Thus, the surfaces of the light transmitting medium serving as the incidence/emission portions are formed to constitute 45° angles to the upper surface of the light transmitting medium. In this case, ideally, the surfaces constituting the incidence/emission portions should be totally reflective surfaces. And at least one of the plural incidence/emission portions may reflect optical signals in a direction difference from the reflective directions of the other incidence/emission portions.

Alternatively, the side surfaces of the light transmitting medium may as well guide the rest part of the optical signal except the part of the optical signal directly reflected to the incidence/emission portion so as to guide to the whole incidence/emission portions. Thus the utilization efficiency of light can be enhanced.

For instance, the light transmitting medium may as well be configured so as to establish the relationship of $\tan\theta \geq \tan 3\theta'$, where $2\theta$ is the diffusion angle of an diffuser and $2\theta'$ is the maximum angle of vision from the optical diffuser toward the closest incidence/emission portion. The light transmitting medium may also be configured so as to establish the relationship of $\theta \leq \phi$ where $2\theta$ is the diffusion angle of the diffuser and $\sin\phi$ is the numerical aperture of the light transmitting medium.

The reflector may either diffusively reflect the optical signal or performs mirror reflection.

It is also possible, using the optical signal transmitting apparatus according to the invention to provide an optical data bus system for transmitting data by way of optical signals.

Here is further proposed a signal processing apparatus provided with an optical signal transmitting apparatus, and an circuit board including a light emitting/receiving element which is disposed to face the incidence/emission portion and transmits and/or detects the optical signal. Thus, when an optical signal is brought to incidence on an incidence/emission portion, it is branched as described above, and emitted externally via the plural incidence/emission portions. The light receiving elements receive optical signals emitted from the plural incidence/emission portions.

Further, a signal processing circuit according to the invention has: a first optical signal transmitting apparatus in which plural incidence/emission portions for the incidence/emission of an optical signal are formed stepwise; a second optical signal transmitting apparatus in which plural incidence/emission portions for the incidence/emission of an optical signal are formed stepwise, or, a supporting board that supports the first optical signal transmitting apparatus and is equipped with plural connectors; plural daughter boards each having a first emission/receiving element disposed to face the incidence/emission portion of the first optical signal transmitting apparatus; and a second emission/receiving element disposed to face the incidence/emission portion of the second optical signal transmitting apparatus, or, a receptive connector to be connected to the connectors. The interval between the first emission/receiving element and the second emission/receiving element or the receptive connectors of the plural daughter boards are set substantially the same, and the plural daughter boards are fitted upright relative to the first optical signal transmitting apparatus. The plural daughter boards are arranged side by side over the first optical signal transmitting apparatus, substantially orthogonal to a line segment connecting the plural incidence/emission portions of the first optical signal transmitting apparatus.

This enables plural boards, for which the spacing between two emission/receiving elements or the spacing between one emission/receiving element and, for instance, a connector for electric signals, is set in common, to be arranged side by side by installing the boards substantially orthogonal to a line segment connecting the plural incidence/emission portions when the boards are installed to the optical signal transmitting apparatus.

BRIEF DESCRIPTION OF THE DRAWINGS

These and other features and advantages of the invention will become more apparent from the following detailed description when taken in conjunction with the accompanying drawings, wherein:

FIGS. 1A and 1B schematically illustrate the configuration of an optical signal transmitting apparatus in a first embodiment of the invention;

FIGS. 2A and 2B schematically illustrate the configuration of an optical signal transmitting apparatus in a second embodiment of the invention;

FIGS. 11A and 11B are conceptual diagrams illustrating a configuration which enables the emitted light intensity to be uniform;

FIGS. 12A and 12B schematically illustrate the configuration of an optical signal transmitting apparatus in a third embodiment of the invention;

FIG. 16 illustrates an example of configuration of an optical data bus using plural optical signal transmitting apparatuses in the second embodiment of the invention;

DESCRIPTION OF THE PREFERRED EMBODIMENTS

[First Embodiment]

Figure 3A:
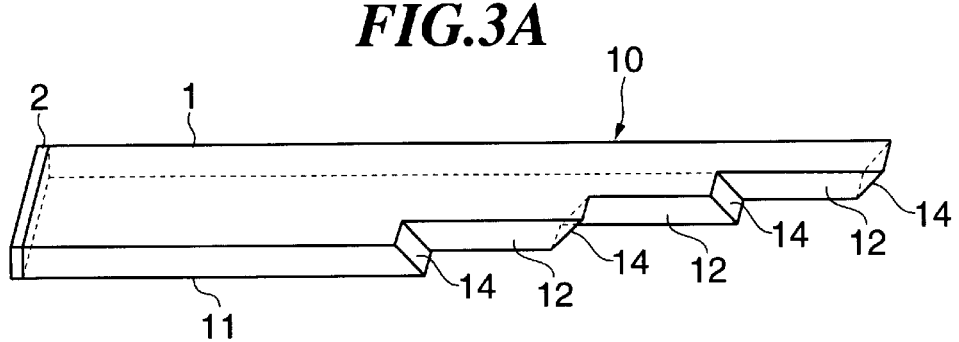
FIGS. 3A through 3D schematically illustrate the configuration of a variation of the optical signal transmitting apparatus in the second embodiment of the invention.

FIG. 1A schematically illustrates the configuration of an optical signal transmitting apparatus 10 in this embodiment. The optical signal transmitting apparatus 10 is provided with a rectangular parallelepiped shaped light transmitting medium 1 having plural (six in this embodiment) stepwise level gaps 12. A reflective optical diffusion layer 2 is disposed on one end face of the light transmitting medium 1, and the other end faces (plural end faces defined by the level gaps 12) 13 of the light transmitting medium 1 function as incidence/emission portions.

Next, with reference to FIG. 1B, a method of branching the light coming incident on the optical signal transmitting apparatus 10 in this embodiment of the invention.

A case in which light comes incident through an incidence/emission portions 131, out of the plural incidence/emission portions 13, and is emitted from incidence/emission portions 131, 132, 133 and 134 will be described. A light beam coming incident through the incidence/emission portions 131 (e.g. a collimated laser beam) travels straight within the light transmitting medium 1, reaches the reflective optical diffusion layer 2 and is diffusively reflected in the vertical direction (the direction of the thickness of the light transmitting medium 1) and the lateral direction (the direction of width of the light transmitting medium 1). The diffusively reflected light propagates within the light transmitting medium 1 while being reflected by its sides, and guided to the whole area of the incidence/emission portions 131, 132, 133 and 134, from which they are emitted. As the diffusively reflected light contains the diffusive light reflected by the sides of the light transmitting medium 1, it does not solely have the diffusive light coming incident on the plural incidence/emission portions (131, 132, 133 and 134).

Here in this embodiment, the light transmitting medium 1 is configured so that its sides reflect other optical signals than those coming directly incident on the plural incidence/emission portions (131, 132, 133 and 134) toward the whole area of the incidence/emission portions.

Thus where the light diffusively reflected by the reflective optical diffusion layer 2 expands wider than the width of the light transmitting medium 1, the diffusive light is totally reflected by the sides of the light transmitting medium 1 at least once. Therefore, by appropriately selecting the angle of the lateral span of the light diffusively reflected by the reflective optical diffusion layer 2, the luminous intensities of the light beams guided to the incidence/emission portions 131, 132, 133 and 134 can be uniformized.

In this embodiment in particular, the optical signal transmitting apparatus 10 is so configured, as illustrated in FIGS. 11A and 11B, as to be compatible with the relationship of tan $\theta \geq \tan 3\theta'$, where $2\theta'$ is the maximum angle of vision toward the position in which the end face 13 (135) closest to the end face where the reflective optical diffusion layer 2 of the light transmitting medium 1 is arranged and $2\theta$, the angle of span (in the lateral direction) according to the diffusion characteristics of the reflective optical diffusion layer 2.

Thus as a result of establishing this relationship of tan $\theta \geq \tan 3\theta'$, diffusive light signals laterally diffused by the reflective optical diffusion layer 2 are totally reflected by the sides of the light transmitting medium 1 at least once, and guided to the other end face of the light transmitting medium 1, i.e. the face having the incidence/emission portions. Where tan $\theta$ is smaller than tan $3\theta'$, the luminous intensity of the emitted light is greater at the center and smaller on the periphery, resulting in a reduced uniformity of emitted light intensity. By contrast, where tan $\theta$ is equal to tan $3\theta$, as shown in FIG. 11B, the diffusive optical signals (directly incident light beams) and the diffusive optical signals totally reflected by the right and left sides(totally reflected light beams) are superposed, making it possible to enhance the uniformity of the luminous intensity of the emitted light.

Moreover, it is also made possible to establish with the relationship of $\theta \leq \phi$ where $2\theta$ is the angle of span according to the diffusion characteristics of the diffusive reflecting section and sin $\phi$ is the numerical aperture of the light transmitting medium, i.e. to keep the angle of incidence of every diffusive optical signal on the top or bottom face of the light transmitting medium 1 at or above the critical angle, so that no part of diffusive light is discharged externally and all the diffusive optical signals can be utilized by having them totally reflected by the top and bottom faces of the light transmitting medium 1, resulting in an enhanced utilization efficiency of optical signals.

As hitherto described, the optical signal transmitting apparatus in this embodiment serves to enhance the utilization efficiency of incident optical signals and makes possible uniform light branching, thereby enabling the output levels in the emission units uniform.

Although the optical signal transmitting apparatus 10 in the embodiment described above has four (or five in FIGS. 11A and B) incidence/emission portions 13, the number of incidence/emission portions 13 is not limited to that, but can be more.

Or, even where at the time of inputting the collimated laser beam does not travel straight within the light transmitting medium 1 but reaches the reflective optical diffusion layer 2 while being totally reflected within, or where the incident light beam has a certain span and reaches the reflective optical diffusion layer 2 while being totally reflected within the light transmitting medium 1, the luminous intensities of the emitted light beams can be substantially equalized.

Furthermore, it is also possible to arrange a clad layer (not shown), having a lower refractive index than the light transmitting medium 1, over the top and bottom faces and the right and left sides (the sides farther from and closer to the viewer of the diagram in the widthwise direction) of the light transmitting medium 1. This enables the light transmitting medium 1 encircled by the clad layer to function as a core section to constitute an optical waveguide. It is possible to form the light transmitting medium 1 or a plastic material such as polymethyl methacrylate, polycarbonate or amorphous polyolefin, inorganic glass of the like, and the stepwise level gaps are formed by grinding. Or where a plastic material is used, injection molding of the like can be applied as well.

As the reflective optical diffusion layer 2, for instance, a beam shaping diffuser:LSD (a product of Physical Optics Corporation) may be used to control over the light transmitting medium 1 with respect to the angles of span of the diffusive light beam in the directions of thickness and of width. A transmissive type LSD is formed by transferring over an epoxy layer arranged on a transparent substrate material such as polycarbonate a hologram face diffusing the incident light in a prescribed angle of diffusion. A reflective type LSD formed by transferring over an epoxy layer of a reflective substrate (e.g. a transparent substrate of which an Al film is laid) a hologram face diffusing the incident light in a prescribed angle of diffusion or by directly laying a reflective film of Al or the like over the transmissive type LSD.

The reflective optical diffusion layer 2 may be a resin film which is a base film, made of tri-acetyl cellulose, for example, spherical particles, ex) $TiO_2$, dispersed on a surface of the base film and a reflective film, such as Al, on the another side of the base film. The expected diffusion can be obtained by selecting the refractive index of the particle and the base film and the distribution of the particles. FT-015 (a product of pola-techno co.) is available for this type of reflective optical diffusion layer.

The film, such as RDF of a product of 3M, which is composed of hundreds of thin films, each having different refractive index, laminated each other may also be used for the diffusion layer.

[Second Embodiment]

Next will be described a second embodiment of the present invention. As this embodiment has similar constituent parts to those in the above-described first embodiment, the same parts are assigned respectively the same reference signs, and their description will be dispensed with.

FIG. 2A schematically illustrates the optical signal transmitting apparatus 10 in this embodiment. The difference of the second embodiment from the first embodiment is that the faces of incidence/emission portions 14 corresponding to the incidence/emission portions 13 in the first embodiment are formed at a 45° angle to the top face of the light transmitting medium 1. Therefore, in the second embodiment, light can be brought to incidence on or emitted from the light transmitting medium 1 in a vertical direction (toward the top face).

Next, a branching method for input light by the optical signal transmitting apparatus 10 in this embodiment will be described with reference to FIG. 2B.

Here is described a case in which light comes incident through, for instance, incidence/emission portions 141 out of the plural incidence/emission portions (total reflective face) 14 and is emitted from incidence/emission portions 141, 142, 143 and 144. A light beam coming incident through the incidence/emission portions 141 (e.g. a collimated laser beam) is totally reflected by the incidence/emission portions 141, travels straight within the light transmitting medium 1, reaches the reflective optical diffusion layer 2 and is diffusively reflected in the vertical direction and the lateral direction.

The diffusively reflected light propagates while being reflected by sides within the light transmitting medium 1, is guided to the whole area of the incidence/emission portions 141, 142, 143 and 144, again totally reflected by the incidence/emission portions 141, 142, 143 and 144, and emitted. The function to uniformize the luminous intensities of the emitted light beams is the same in the first embodiment.

The directions of incidence and emission are not limited to the upward vertical, but may as well be downward vertical or lateral (between right and left), and can be varied by correspondingly selecting the direction of the formation of the incidence/emission portions. It is also possible to combine different directions of incidence and emission as illustrated in FIGS. 3A through 3D for example.

Figure 3B:
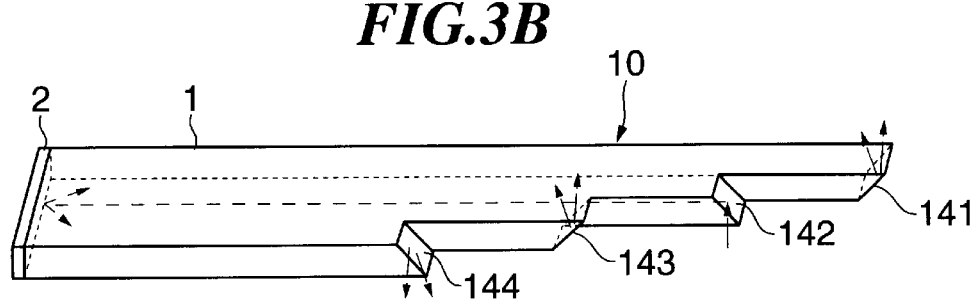

In FIGS. 3A and 3B are illustrated light transmitting media 1 in the same shape, and FIG. 3B shows the directions of incidence and emission of optical signals on and from the light transmitting medium 1 in FIG. 3A (coming incident through the incidence/emission portions 142). Thus, faces are formed on the incidence/emission portions 141 and 143 at a 45° angle to the top face of the light transmitting medium 1 so that optical signals come incidence downward vertically and be emitted upward vertically, while faces of the incidence/emission portions 142 and 144 are formed at a 45° angle to the bottom face of the light transmitting medium 1 so that optical signals come incidence upward vertically and be emitted downward vertically.

Figure 3C:
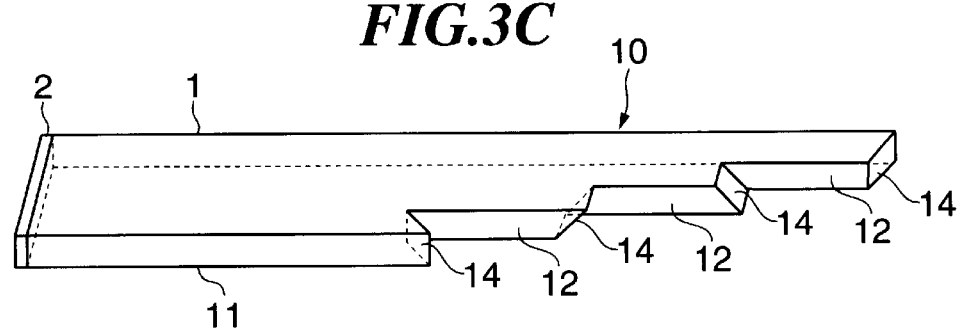
Figure 3D:
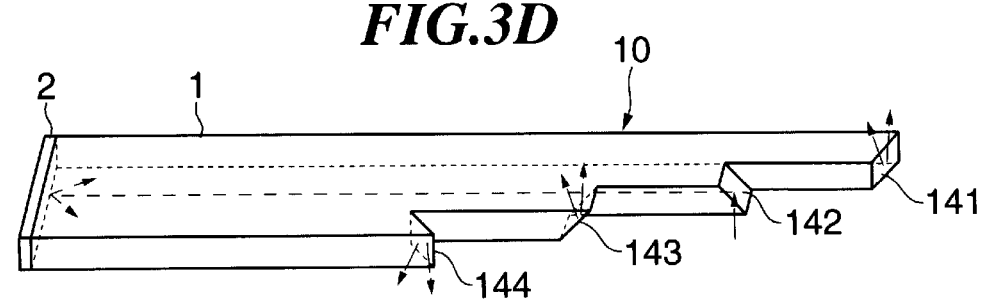
Figure 4A:
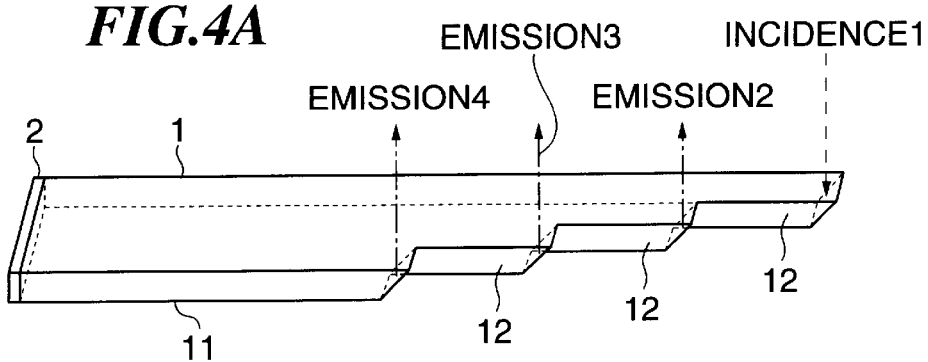
FIGS. 4A through 4D illustrate the states of incidence and emission of optical signals in the optical signal transmitting apparatus in the second embodiment of the invention.
Figure 4B:
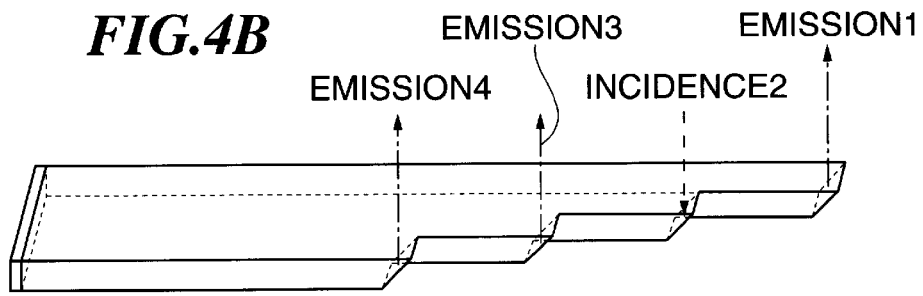
Figure 4C:
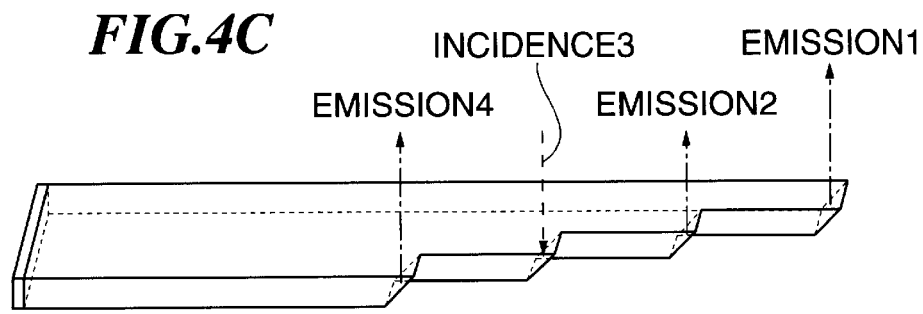
Figure 4D:
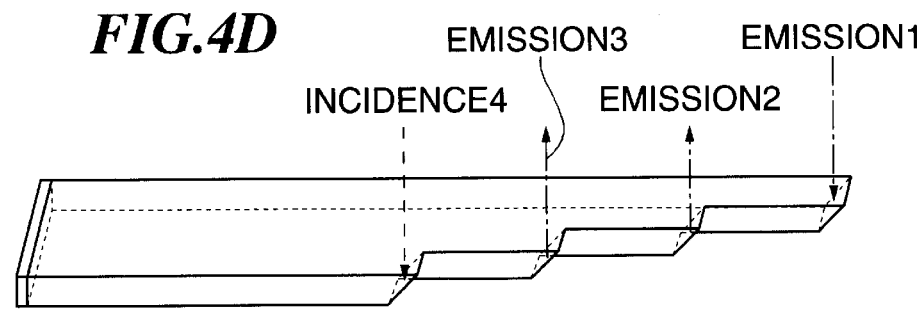

FIGS. 3C and 3D illustrate light transmitting media 1 in the same shape, FIG. 3D shows the directions of incidence and emission of optical signals on and from the light transmitting medium 1 in FIG. 3C. Thus faces are formed on the incidence/emission portions 141 at a 45° angle to the farther side of the light transmitting medium 1 so that optical signals come incidence leftward and are emitted rightward; faces on the incidence/emission portions 142 are formed at a 45° angle to the bottom face of the light transmitting medium 1 so that optical signals come incidence upward vertically and are emitted downward vertically; and faces on the incidence/emission portions 143 are formed at a 45° angle to the nearer side of the light transmitting medium 1 so that optical signals come incidence rightward and are emitted leftward.

Figure 5:
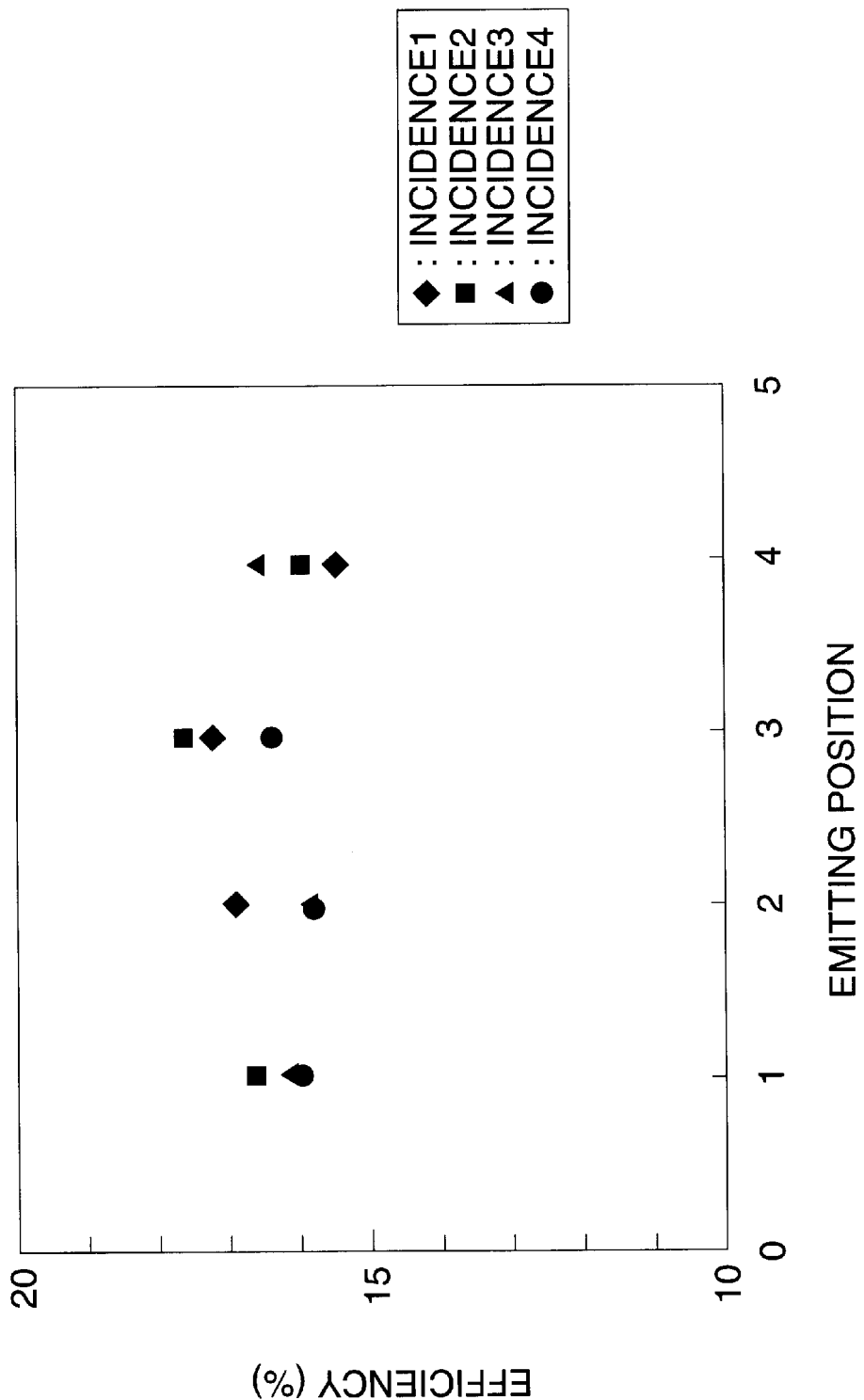
FIG. 5 illustrates the emission of emitted light in the second embodiment.
Figure 6:
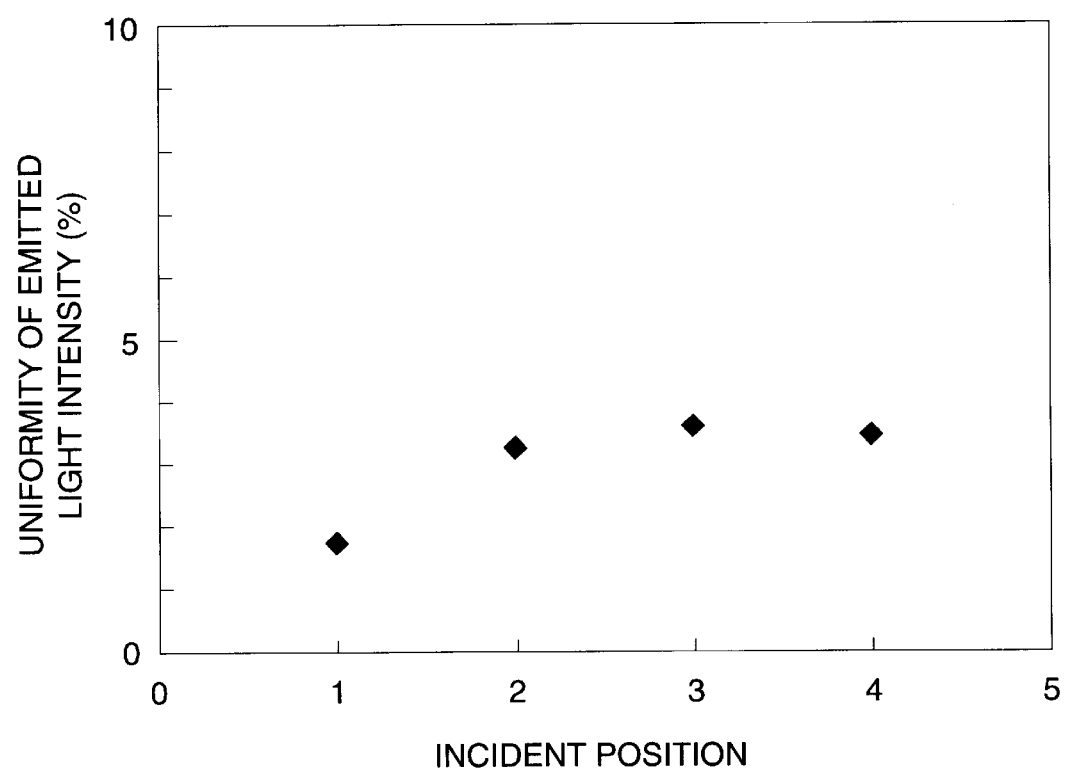
FIG. 6 illustrates the uniformity of emitted light intensity in the second embodiment.
Figure 7:
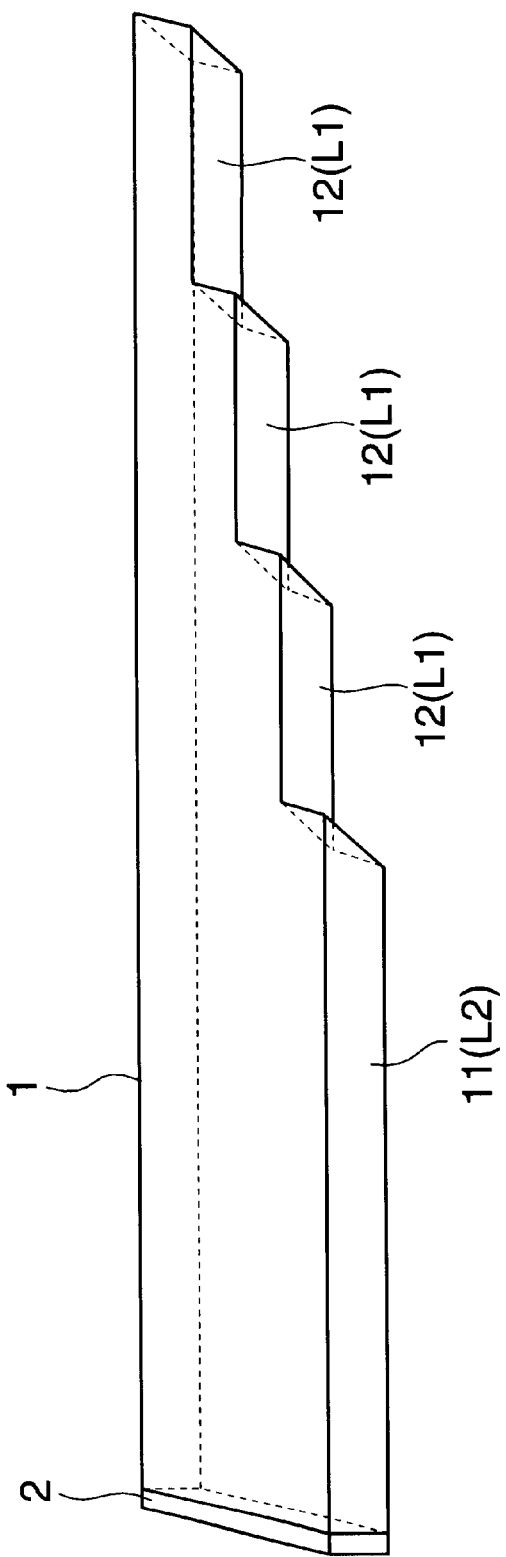
FIG. 7 illustrates L2 and L1.

FIG. 5 and FIG. 6 reveal the uniformity, as also illustrated in FIGS. 4A through 4D, of efficiencies and intensities of light beams emitted from the incidence/emission portions 13 in a case where, of the light emitting medium 1 in the second embodiment, the overall length H1 is 45 mm, the width H2 is 4 mm and the thickness H3 is 1 mm, a section 11 whose length is the distance H4 to the incidence/emission portions 144 closes to the end face on which the reflective optical diffusion layer 2 is arranged is 30 mm, the length H5 of each of the stepwise level gaps 12 is 5 mm, and the reflective optical diffusion layer 2 has an Al-sputtered LSD of 0.2×40 PC-8 (in which diffusive light has a 0.2° angle of span in the thickness direction and a 40° angle of span in the widthwise direction) to serve as a reflective layer is used on the face opposite to the face on which a hologram is formed (the back face of the LSD substrate).

As illustrated in FIG. 5, through whichever (out of incidences 1 through 4) incidence/emission portion light may come incident, the efficiency of emitted light from the incidence/emission portion is approximately 18%. Further, as shown in FIG. 6, the uniformity of the luminous intensities of emitted light beams among different incidence/emission portions (((maximum efficiency−minimum efficiency)/(maximum efficiency+minimum efficiency))× 100[%]) is at a very satisfactory level, the deviation being approximately 4%.

Incidentally, the light source used is an end face light emitting type laser diode emitting light of 680 nm in wavelength.

Figure 8:
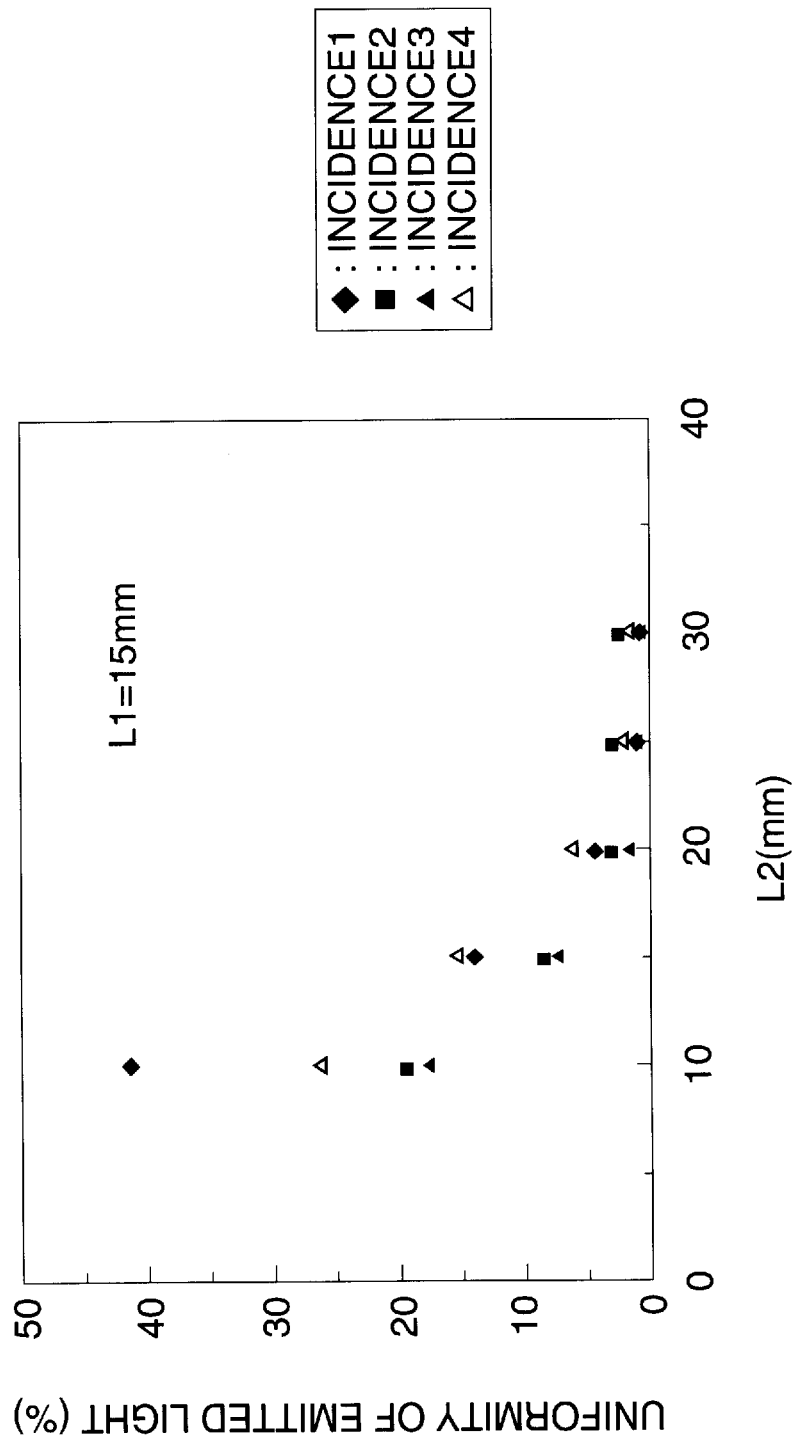
FIG. 8 is a diagram illustrating the uniformity of emitted light intensity in a light beam tracking simulation wherein L2 and L1 are varied.
Figure 9:
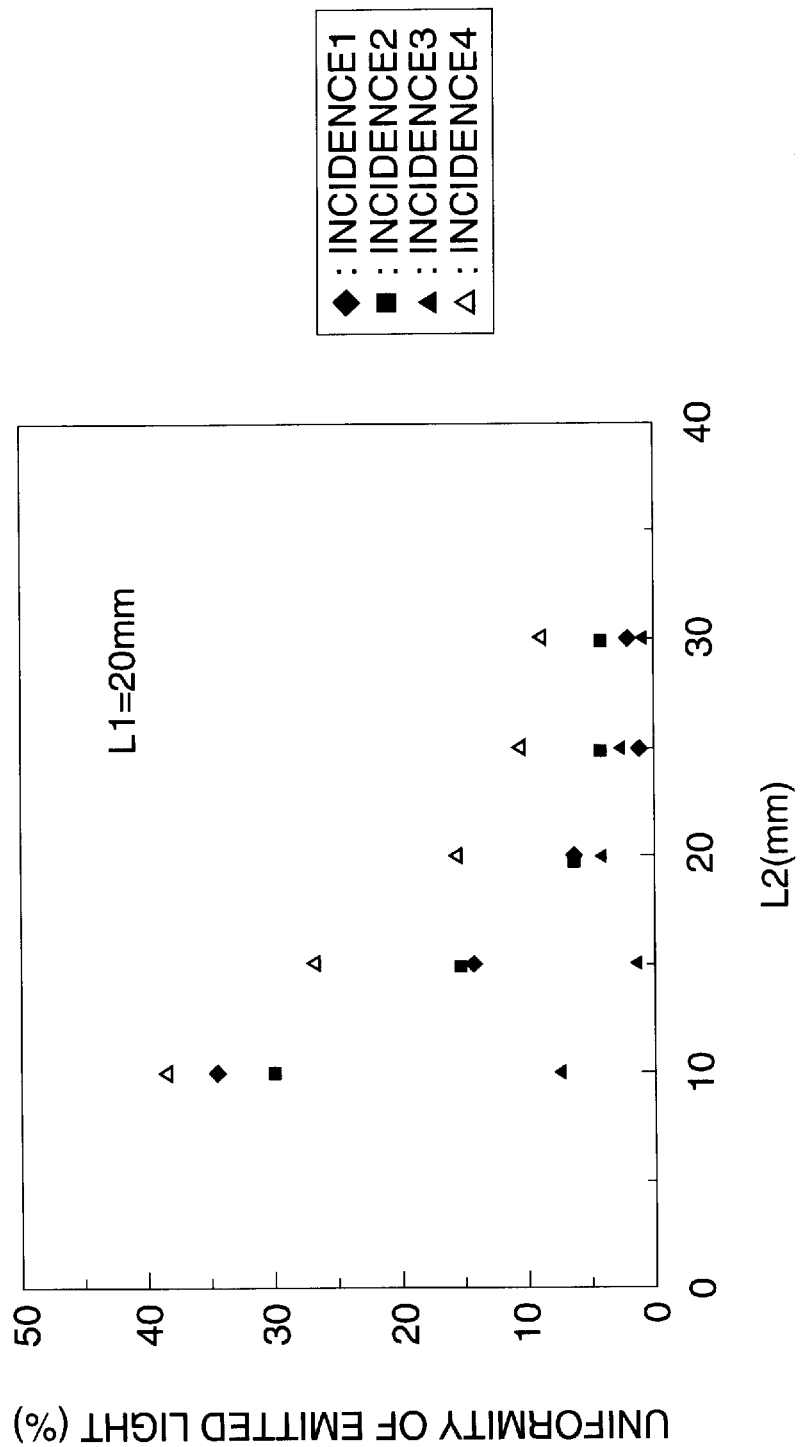
FIG. 9 is another diagram illustrating the uniformity of emitted light intensity in a light beam tracking simulation wherein L2 and L1 are varied.
Figure 10:
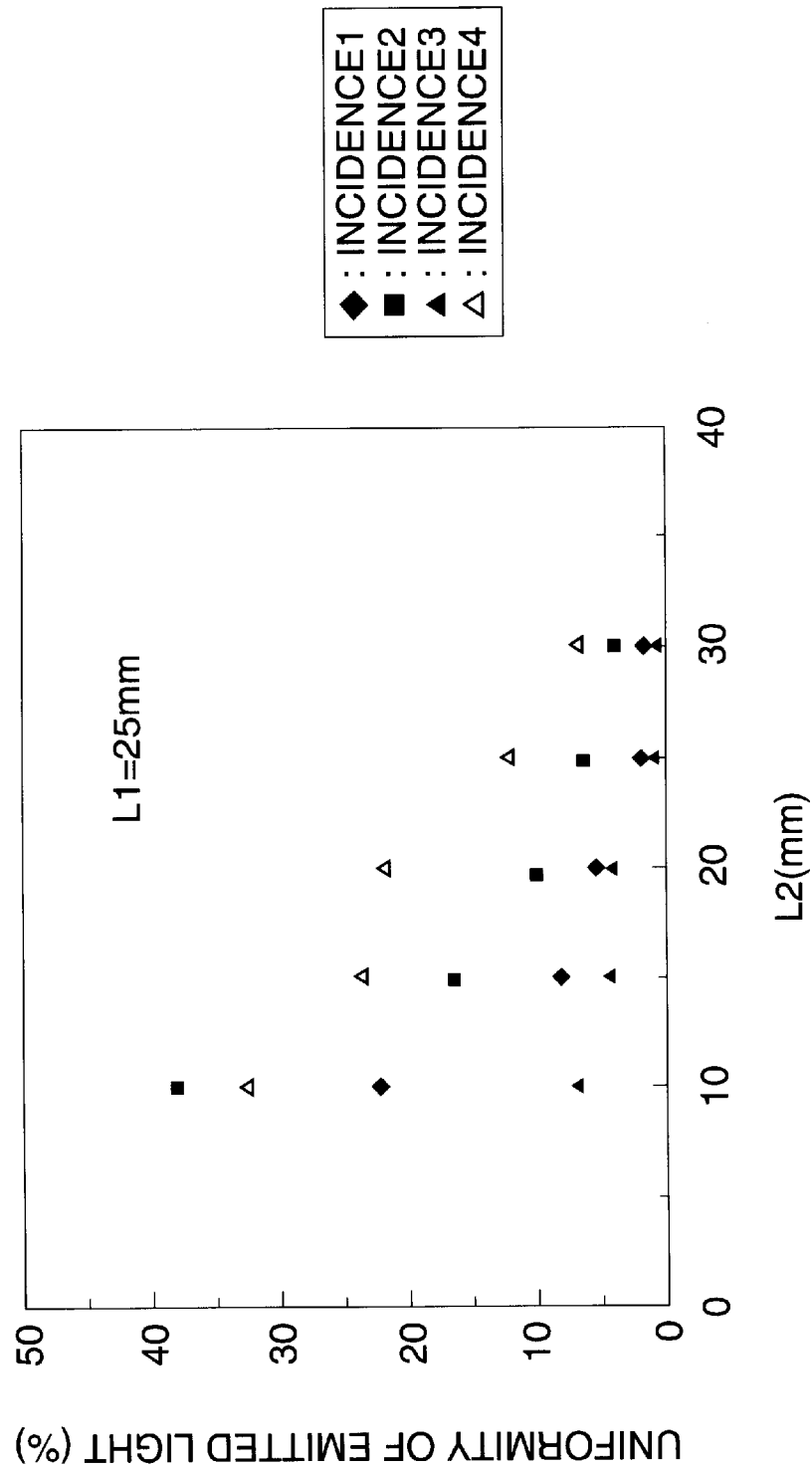
FIG. 10 is still another diagram illustrating the uniformity of emitted light intensity in a light beam tracking simulation wherein L2 and L1 are varied.

Further, FIG. 8 through FIG. 10 illustrate the uniformity of emitted light intensity in light beam tracking simulation in a case where, the light transmitting medium 1 being 4 mm wide and 1 mm thick, the distance 11 (L2) from the end face on which the reflective optical diffusion layer 2 is arranged to the nearest incidence/emission portion 144 and the level gap length 12(L1) are varied. As can be understood from FIG. 8 through FIG. 10, the shorter the L2(reduced from 40 to 10) and the longer the L1 (extended from 15 to 25) are, the poorer the uniformity is. Further from the result of simulation, it is known that by keeping L2 not smaller than L1, preferably at least twofold of L1, a uniformity level 10% or less in deviation can be achieved for emitted light intensity. In the above-described first and second modes of implementation, the length, and accordingly the shape, are determined on the basis of this finding.

[Third Embodiment]

Next will be described a third embodiment of the present invention. As this embodiment is similar to the first and second modes of implementation so far described, the same parts are assigned respectively the same reference signs.

FIG. 12A schematically illustrates the optical signal transmitting apparatus 10 in this embodiment. The optical signal transmitting apparatus 10 is provided with a cuboidally shaped light transmitting medium 1 having plural (three in this embodiment) stepwise level gaps 12. Plural end faces defined by the level gaps 12 function as incidence/emission portions 131, 132, 133 and 134. On end faces opposite to the plural end faces of the light transmitting medium 1 are formed plural (four in this embodiment) light reflecting layers 4 of Al or some other material permitting mirror reflection, each matching one or another of the incidence/emission portions 131, 132, 133 and 134. Since the positions of the incidence/emission portions 131, 132, 133 and 134 relative to the optical signal transmitting apparatus 10 differ from one another, the angle of each light reflecting layer 4 is set so as to direct the reflected optical signals toward the whole area of the incidence/emission portions.

FIG. 12B illustrates the optical signal transmitting apparatus 10 in which the faces of the incidence/emission portions 141, 142, 143 and 144 respectively matching the incidence/emission portions 131, 132, 133 and 134 shown in FIG. 12 are formed at a 45° angle to the top face of the light transmitting medium 1. While light is brought to incidence and emitted horizontally (in the lengthwise direction) relative to the light transmitting medium 1 in the optical signal transmitting apparatus 10 shown in FIG. 12A, it is brought to incidence and emitted vertically (in the thickness direction) relative to the light transmitting medium 1 in the optical signal transmitting apparatus 10 shown in FIG. 12B.

Next, a branching method for input light by the optical signal transmitting apparatus 10 in this embodiment will be described. The case taken up here is one in which FIG. 12A illustrates a case in which light comes incident through for instance, an incidence/emission portion 131 out of the plural incidence/emission portions 13 and is emitted from incidence/emission portions 131, 132, 133 and 134. A light beam coming incident through the incidence/emission portion 131 (e.g. a beam radiated from a laser diode) travels straight within the light transmitting medium 1, reaches the light reflecting layer 4. Usually a laser beam is radiated at angles of radiation (in the thickness direction (81) and the widthwise direction (82)). When the laser beam reaches the light reflecting layer 4, it is reflected by the light reflecting layer at angles of span θ1 (in the thickness direction) and θ2 (in the widthwise direction) (provided that the whole incident light is reflected by the incidence/emission portions).

The reflected laser beam is propagated while being reflected by the sides within the light transmitting medium 1, guided to the whole area of the incidence/emission portions 131, 132, 133 and 134, and emitted. Light guided to the input/output units includes not only light that directly comes incident through the incidence/emission portions 131, 132, 133 and 134 but also light reflected by the sides within the light transmitting medium 1.

Consequently, if the light reflected by the light reflecting layer 4 expands beyond the width of the light transmitting medium 1, it is totally reflected by the sides of the light transmitting medium 1 at least once. Therefore, by appropriately selecting the angle of the lateral span of the light (determined by the radiation angle of the laser diode), the luminous intensities of the emitted light beams guided to the incidence/emission portions 131, 132, 133 and 134 can be uniformized.

In the embodiment so far described, the optical signal transmitting apparatus 10 has four incidence/emission portions 131, 132, 133 and 134, the number of incidence/emission portions is not limited to this.

It is also possible to arrange on the top and bottom faces and the right and left sides in the widthwise direction of the light transmitting medium 1 clad layers (not shown) that have a lower refractive index than the light transmitting medium 1 does. This enables the light transmitting medium 1 encircled by the clad layers to function as a core section to constitute an optical waveguide.

In this embodiment, by using a light reflecting layers 4 of Al or some other material permitting mirror reflection, it is possible to prevent partial penetration of the optical signals to outside the light transmitting medium 1 even where the laser beam has some span.

[Fourth Embodiment]

Figure 13:
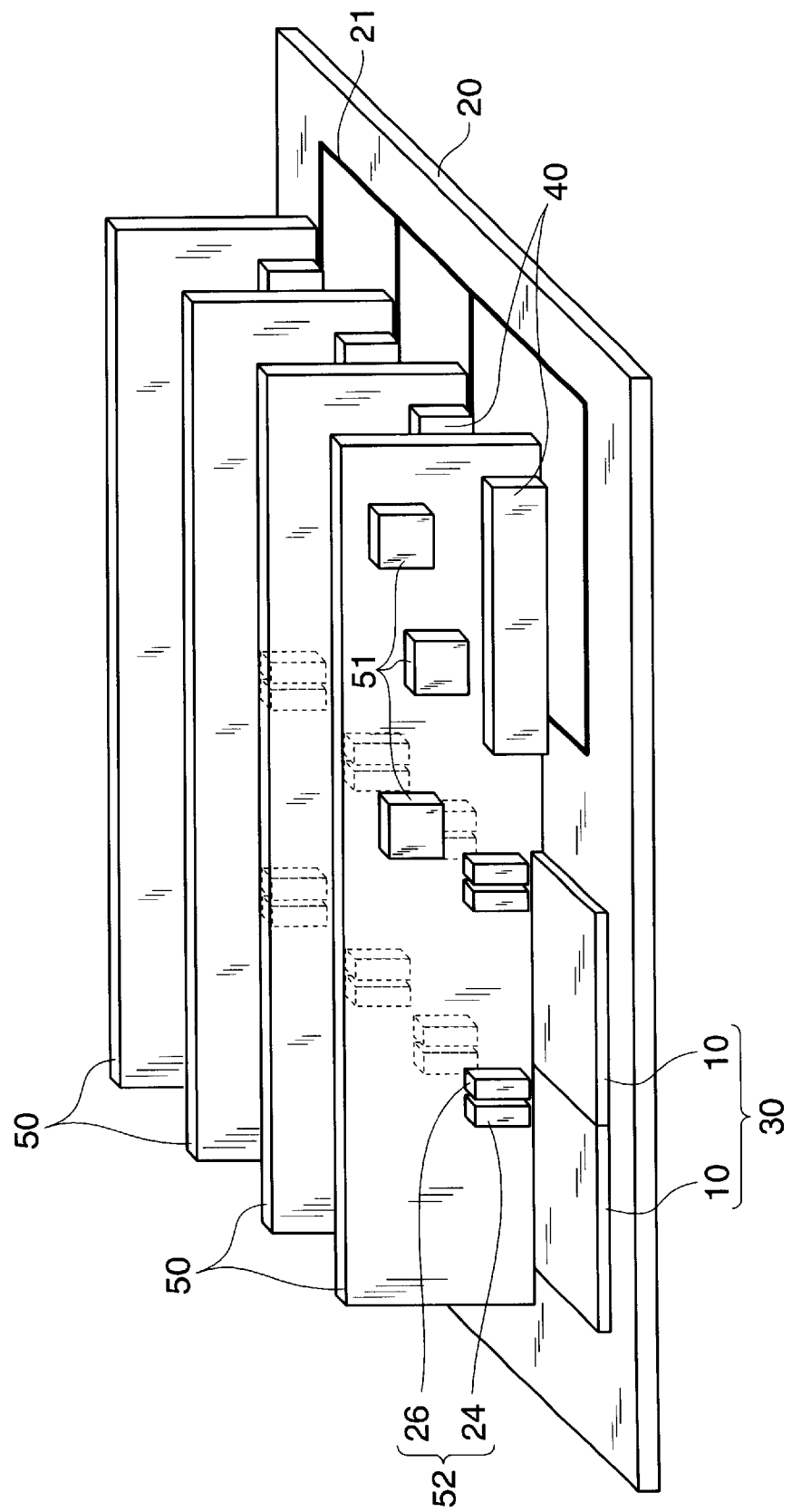
FIG. 13 is a perspective view illustrating a signal processing apparatus using an optical data bus.

Next will be described a fourth embodiment of the present invention. In a signal processing apparatus in this embodiment, as illustrated in FIG. 13, plural daughter boards 50 are optically connected to one another by an optical data bus 30 including plural optical signal transmitting apparatuses 10 in the second embodiment (FIG.2).

Thus in the signal processing apparatus in this embodiment, the optical data bus 30 mounted with plural optical signal transmitting apparatuses 10 in parallel is fixed onto a supporting board 20. The lengths of the stepwise level gaps 12 (see FIG. 2) of the optical signal transmitting apparatus 10 are determined by the fitting positions of the plural daughter boards 50. The distances between adjoining plural daughter boards 50 are usual, but if they are not, the lengths of the level gaps 12 are adjusted correspondingly.

Over the supporting board 20 are fixed board connectors 40, and to each board connector 40 is fitted a daughter board 50. Electric wiring arrangements 21 for power supply and electric signal transmission are also laid over the supporting board 20, and these electric wiring arrangements 21 are electrically connected via the board connectors 40 to electronic circuits 51 over the daughter boards 50 fitted to the board connector 40.

Each of the daughter boards 50 is provided with plural light emitting/receiving elements 52, such as pairs of a light emitting element 24 and a light receiving element 26, and, fitting that daughter board 50 to the board connector 40, each of the light emitting/receiving elements 52 is optically coupled to the optical data bus 30. An optical signal emitted from a given light emitting/receiving element 52 comes incident on the optical data bus 30 (the incidence/emission portions 14), is branched as described above, and received by other light emitting/receiving elements 52 via each incidence/emission portion. This configuration makes possible transmission/reception of parallel optical signals including plural bits and independent simultaneous transmission/reception of each bit.

In embodiments, the light emitting element 24 may be arranged to be closer to the reflector 2 of the light transmitting medium than the light receiving element 26. Further, in embodiments, a light detecting area of the light receiving element 24 may be substantially equal to or greater than an area of the corresponding incidence/emission portion 14 for emitting the optical signal. Also, in such embodiments, the light detecting area of the light receiving element 24 may be slid from a center of the corresponding incidence/emission portion 14 so as to be away from the reflector 2.

[Fifth Embodiment]

Figure 14:
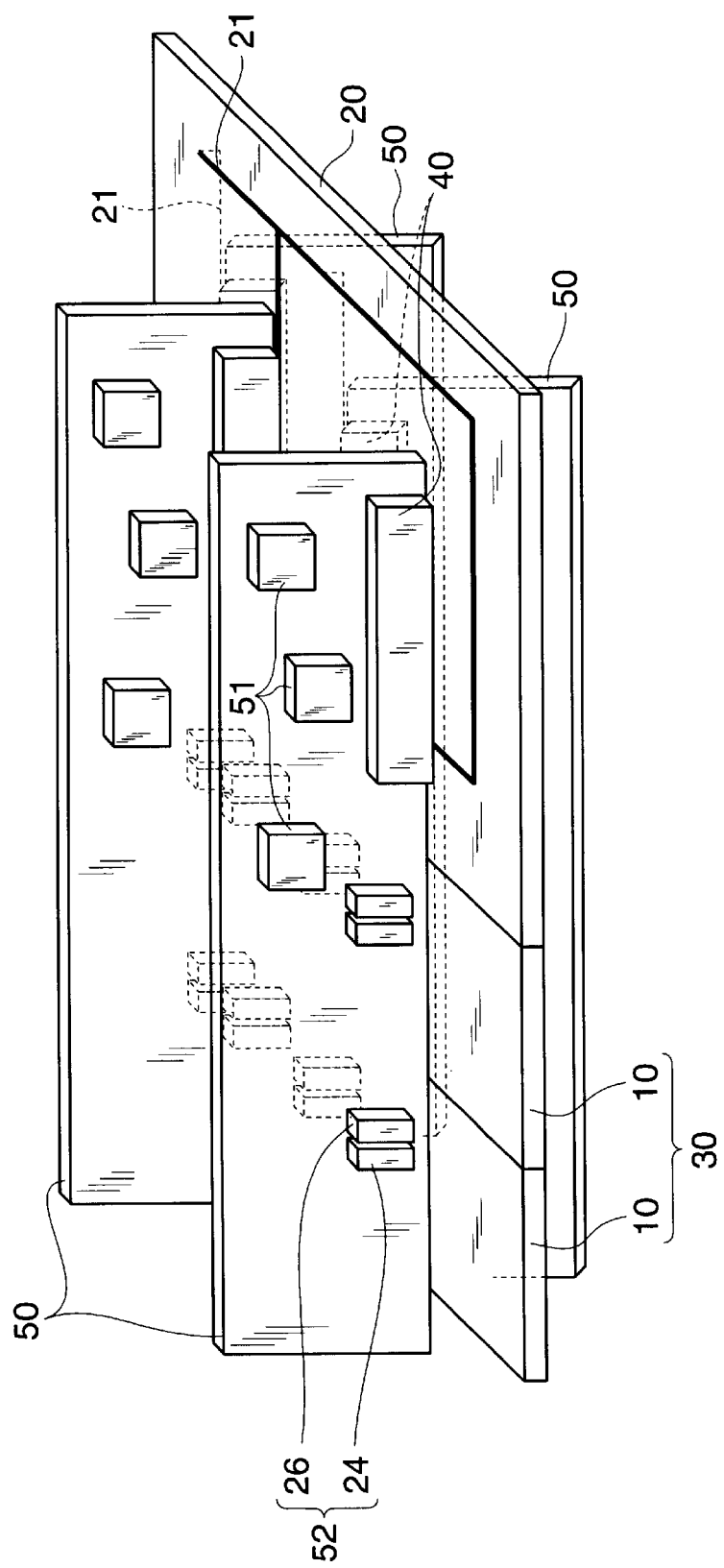
FIG. 14 is a perspective view illustrating another example of signal processing apparatus using an optical data bus.

Next will be described a fifth embodiment of the present invention. In a signal processing apparatus in this embodiment, as illustrated in FIG. 14, plural daughter boards 50 are optically connected to one another by the optical data bus 30 including plural optical signal transmitting apparatus 10 in the second embodiment (see FIG. 3).

While the plural daughter boards 50 are connected in the same direction relative to the supporting board 20 in the signal processing apparatus in the fourth embodiment (FIG. 13), the signal processing apparatus in this embodiment (FIG. 14) differs in that its plural daughter boards 50 are connected to the front and rear sides of the supporting board 20.

As described above, in either the fourth or fifth embodiment of the invention, since the signal processing apparatus is configured of plural daughter boards using an optical transmission is made possible between any pair of daughter boards and, since a light transmissive material is used for the transmission medium, there is obtained an optical bus system highly resistance to temperature fluctuations or environmental variations due to dust or the like.

Figure 15:
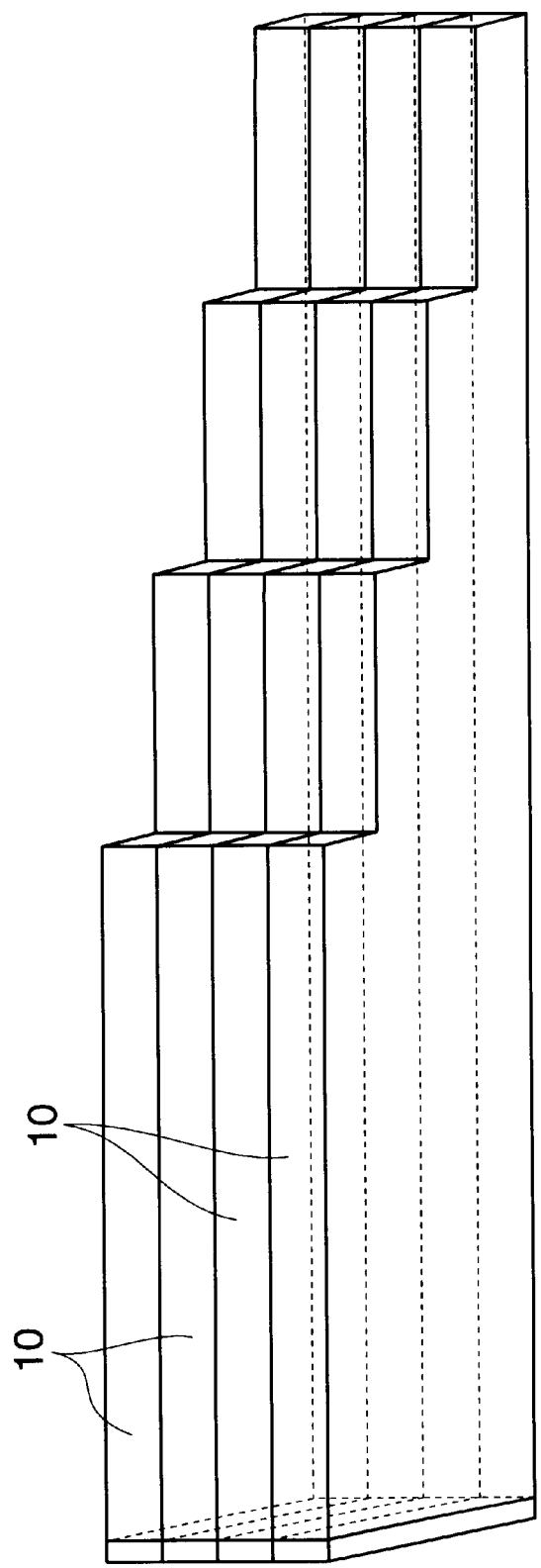
FIG. 15 illustrates an example of configuration of an optical data bus using plural optical signal transmitting apparatuses in the first embodiment of the invention.
Figure 17A:
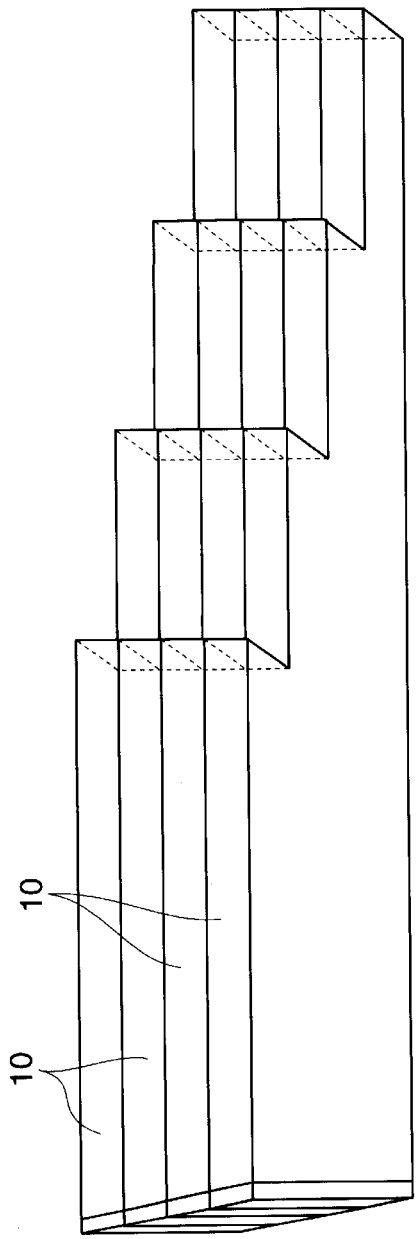
FIGS. 17A and 17B illustrate another example of configuration of an optical data bus using plural optical signal transmitting apparatuses in the second embodiment of the invention.
Figure 17B:
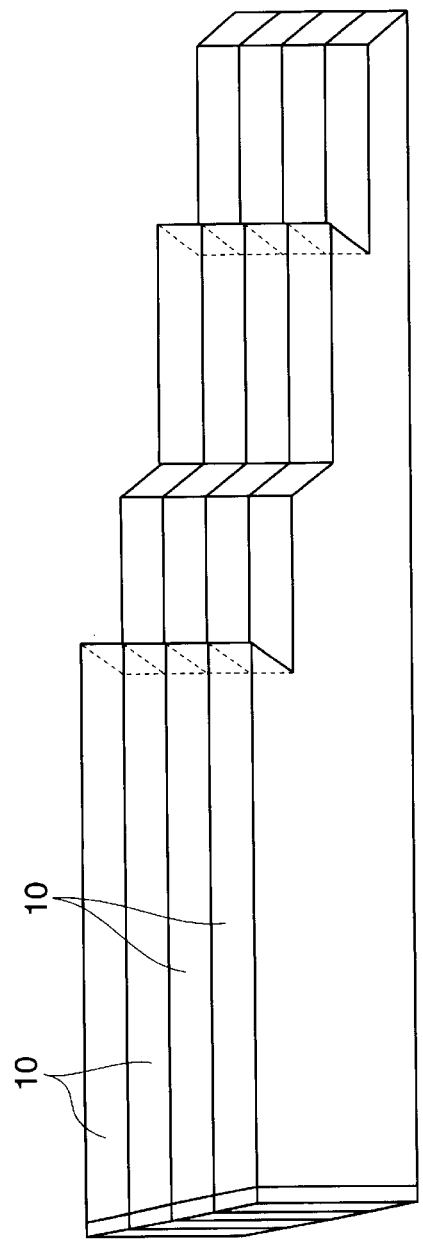

FIG. 15 through FIGS. 17A and 17B illustrate the configurations of optical data buses 30 in each of which plural optical signal transmitting apparatuses 10 in either the first or the second embodiment. Thus FIG. 15 shows a configuration in which plural optical signal transmitting apparatus in the first embodiment (see FIG. 1) are stacked in the thickness direction, while FIG. 16 shows a configuration in which plural optical signal transmitting apparatuses 10 in the second embodiment (see FIG. 2) are stacked in the widthwise direction. FIG. 17A illustrates a configuration in which plural optical signal transmitting apparatuses 10 in the second embodiment (see FIG. 2) are stacked in the thickness direction, while FIG. 17B illustrates a variation of the configuration shown in FIG. 17A, the facts of the incidence/emission portions being formed at a 45° to either the farther or the nearer a side of the light transmitting medium 1. Incidentally, the configurations illustrated here are just examples, and a configuration combining plural optical signal transmitting apparatuses 10 shown in FIG. 3 is also possible.

[Sixth Embodiment]

Figure 18:
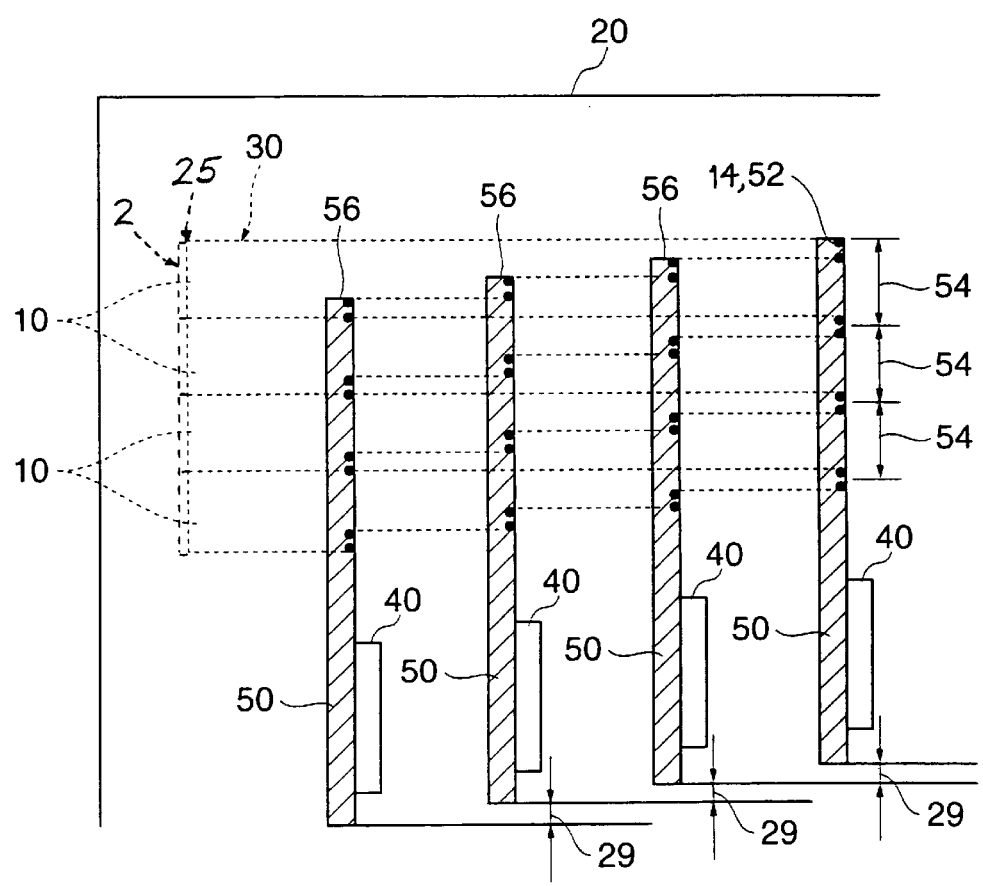
FIG. 18 illustrates a layout of an optical signal transmitting apparatus in a fourth embodiment of the invention.

FIG. 18 illustrates the arrangement of an optical data bus 30, using plural optical signal transmitting apparatuses 10 in the fourth embodiment shown in FIG. 13, and of daughter boards 50. Sides 25, each having a reflective layer 2, of the plural optical signal transmitting apparatuses 10 are aligned, and the incidence/emission portions 14 are aligned to match the respective incidence/emission bodies 52 of the daughter boards 50. Accordingly, end faces 56 of the daughter boards 50 are not positioned on the same plane, but arranged in positions having lags 29 from one another, each lag being equal to the level gap of the incidence/emission portions in the direction of the width of the optical signal transmitting apparatus 10.

Figure 19:
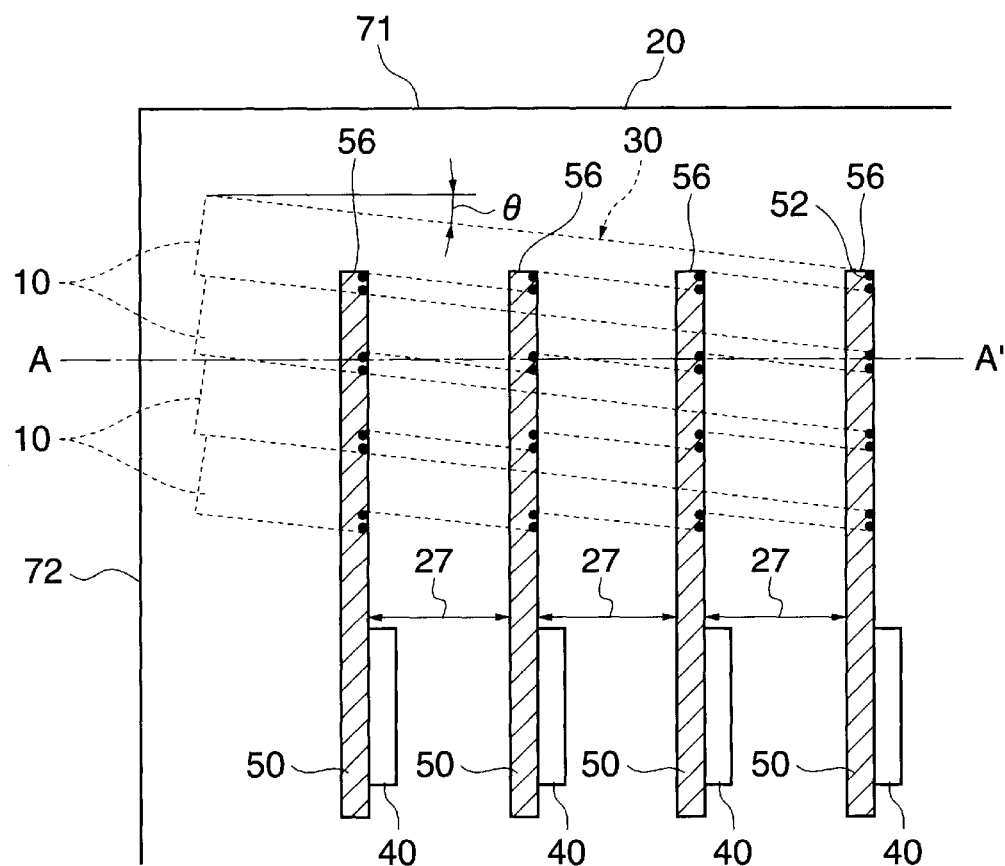
FIG. 19 illustrates a layout of an optical signal transmitting apparatus in a fifth embodiment of the invention.
Figure 20:
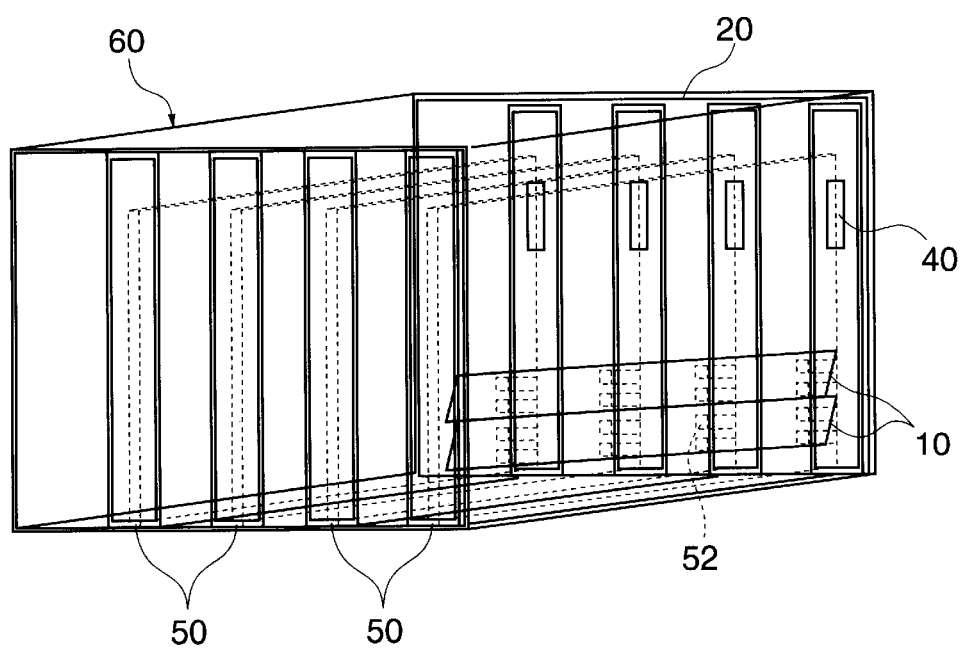
FIG. 20 illustrates a layout of a bookshelf type.

By contrast, in the embodiment illustrated in FIG. 19, the incidence/emission portions 14 of the optical transmitting apparatuses 10 are inclined by θ° relative to the plural daughter boards 50 so as to match the corresponding incidence/emission bodies 52. In other words a line segment A–A' connecting the plural incidence/emission portions are substantially orthogonal to the daughter boards 50. By disposing the optical signal transmitting apparatus 10 in this way, it is made possible to arrange the end faces 56 of the plural daughter boards 50 to position them on the same plane and to arrange the daughter boards 50 in a bookshelf form as illustrated in FIG. 20.

As shown in FIG. 18, if there are lags 29 between the end face 56 of the plural daughter boards 50, the shape of the optical data bus 30 has to be taken into consideration in designing the supporting board 20 and the daughter board connectors 40. This means corresponding complexities in designing and producing the supporting board 20 and daughter board connectors 40. Also in combining the supporting board 20 and the daughter boards 50, relative positioning is made difficult by the non-horizontal or nor-vertical relative positions. As illustrated in FIG. 18, the optical signal transmitting apparatus 10 and the supporting board 20 are provided so that a line segment defined by the plural incidence/emission portions 14 and a line segment defined by the plural connectors 40 are substantially parallel. That is, a line segment drawn through a same portion, such as a right-upper corner, of the plural incidence/emission portions 14 is substantially parallel to a line segment drawn through the same portion (right-upper corner) of the plural connectors 40. The arrangement illustrated in FIG. 18 facilitates not only the designing and production of the supporting board 20 and daughter board connectors 40 but also the relative positioning of the supporting board 20 and the daughter boards 50 when they are to be combined.

Figure 21:
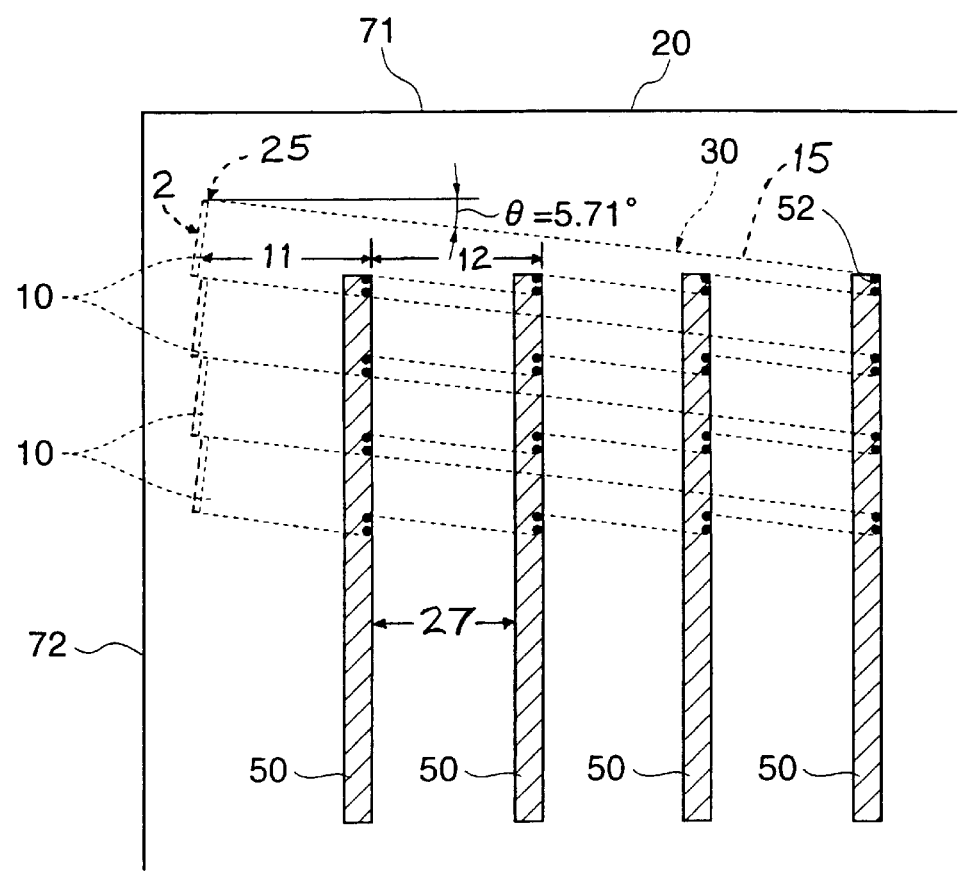
FIG. 21 illustrates a layout of an optical signal transmitting apparatus embodying the fifth embodiment of the invention.

An embodiment of this embodiment is illustrated in FIG. 21. FIG. 21 illustrates a case in which is used an optical signal transmitting apparatus 10 wherein the maximum dimension of the light transmitting in the lengthwise direction, i.e. the side 15 is 60 mm, its maximum dimension in the widthwise direction, i.e. the side 25 is 4 mm, the distance 11 to the incidence/emission portion closest to the end face on which the reflective layer 2 is arranged is 30 mm, the length 12 of each of the stepwise level gaps is 10 mm, and the width 23 of each of the incidence/emission portions is 1 mm (see FIG. 2). Here the spacing 27 between each adjoining pair of plural daughter boards 50 is 10.05 mm, which can be calculated by Equation (1). To add every daughter board 50 is of the same design, and a light emitting/receiving element 52 is fitted in the same relative position of each daughter board 50.

$$p=\sqrt{w^2+d^2} \qquad (1)$$

In (1), p is the distance 27 between each adjoining pair of plural daughter boards 50 (see FIG. 19); w, the width 23 of each incidence/emission portion; and d, the length 12 of each of the stepwise level gaps.

The angle θ between the optical signal transmitting apparatus 10 and the daughter boards 50 when the optical signal transmitting apparatus 10 is fitted to the supporting board 20 is determined by (2). By fitting the optical signal transmitting apparatus 10 to the supporting board 20 at this angle θ, it is made possible to configure the daughter boards 50 in a bookshelf form.

$$\theta=\tan^{-1}(w/d) \qquad (2)$$

[Seventh Embodiment]

Figure 22:
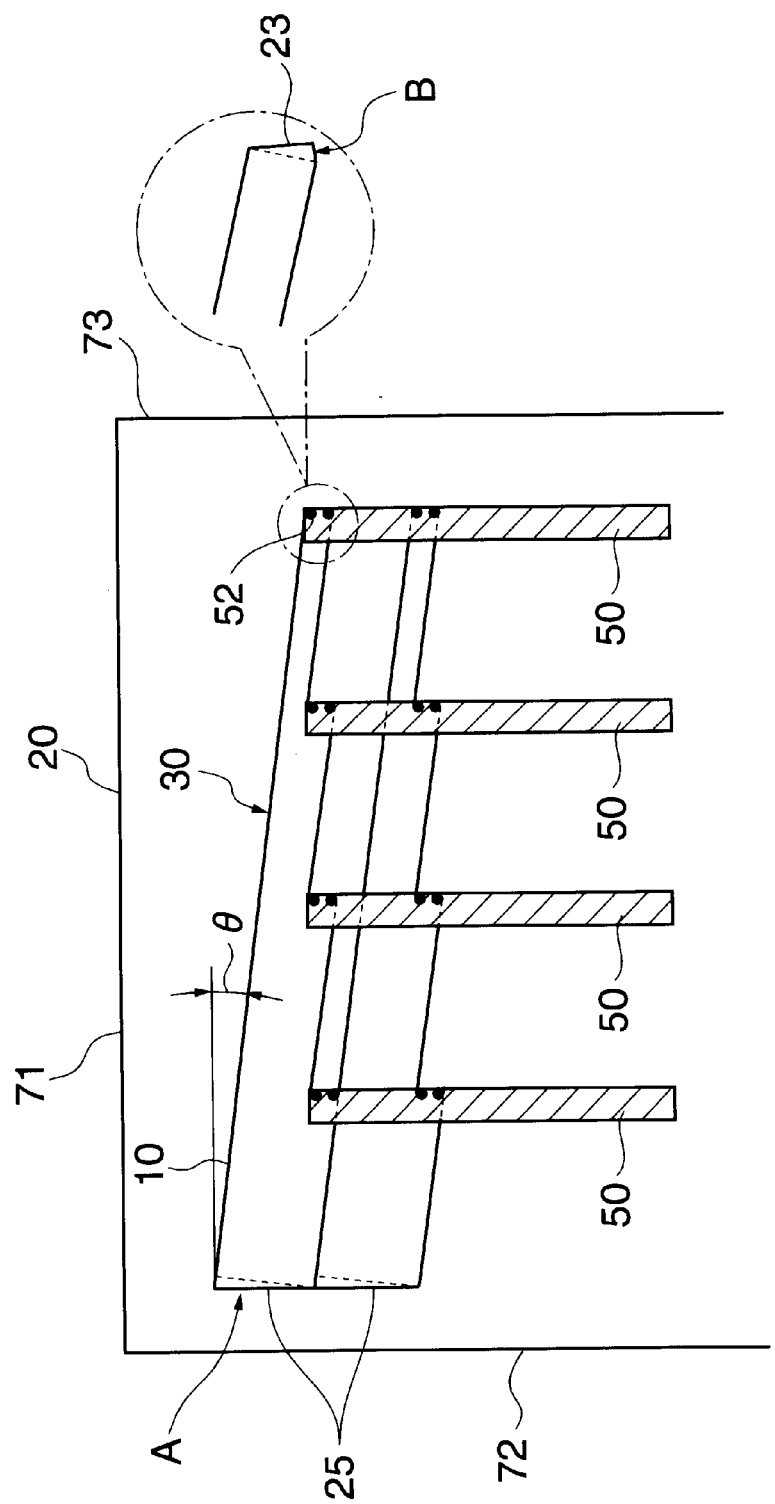
FIG. 22 illustrates a layout of an optical signal transmitting apparatus in a sixth embodiment of the invention.

The seventh embodiment of the invention illustrated in FIG. 22 is a variation from the shape of the optical signal transmitting apparatus 10 in the sixth embodiment (FIG. 19).

Thus, as shown in FIG. 22A by taking into account in designing the optical signal transmitting apparatus 10 the angle θ at which the optical signal transmitting apparatus 10 is fitted to the supporting board 20, it is arranged over the supporting board 20 so that the side 25 formed by the crossing of the top face of the optical signal transmitting apparatus and the reflective layer 2, which is the first reflective face, becomes opposite to the opposite side 72 of the supporting board 20.

Forming the optical signal transmitting apparatus 10 in such a shape facilitates its relative positioning when the optical signal transmitting apparatus 10 is to be combined with the supporting board 20. It affects in no significant way the optical signals uniformity of transmission and the utilization efficiency of optical signals.

Furthermore, as illustrated in FIG. 22B, the arrangement over the supporting board 20 may as well be such that the side 23 in the widthwise direction formed by the crossing of the incidence/emission faces of the incidence/emission portions 13 of the light transmitting medium 1 and the top face of the optical signal transmitting apparatus 10 is parallel to the side 73 of the supporting board 20 opposite to the side 23.

The signal processing apparatus in either the sixth or the seventh embodiment, laying out the supporting board and the daughter boards in a bookshelf type arrangement is made possible. The bookshelf type layout of the supporting board and the daughter boards facilitates not only the designing and production of the supporting board but also of the relative positioning when the supporting board and the daughter board are to be combined.

[Eight Embodiment]

Now will be described a way of laying out (see FIG. 23) light emitting elements 24 for bringing signal light incident on the above-described light branching apparatus 10 and light receiving elements 26 for receiving signal light emitted from the light branching apparatus 10.

The layout in this eight embodiment concerns the arrangement of the light emitting areas 240 of the light emitting elements 24 and the light receiving areas 260 of the light receiving elements 26 when the projection faces of the incidence/emission portions 14 (14A, 14B, 14C and 14D) of the light transmitting medium 30 and the size of the light receiving areas 260 of the light receiving elements 26 (in this embodiment each light receiving area 260 is a rectangle of which the length of a side is 1 mm) are substantially equal.

Figure 23A:
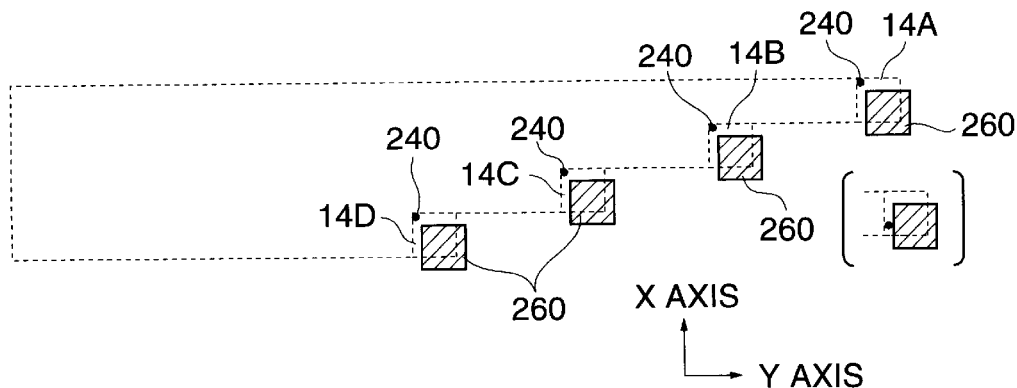
FIG. 23 illustrates a layout of an optical signal transmitting apparatus in a seventh embodiment of the invention.
Figure 23B:
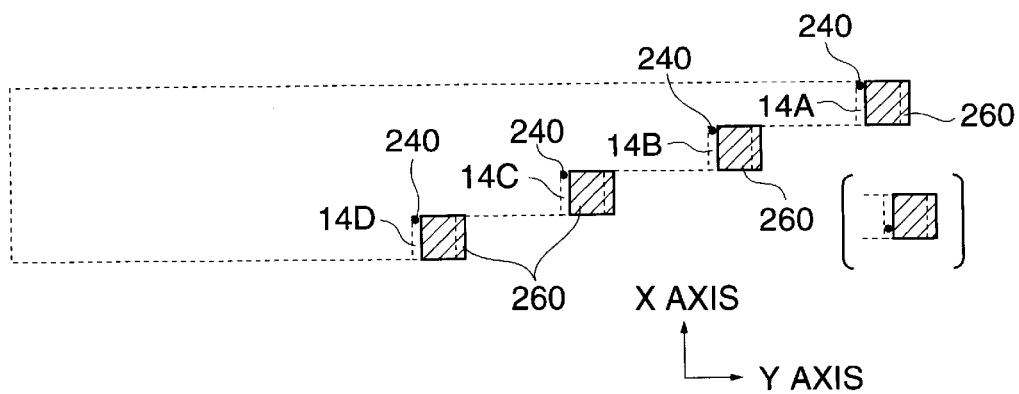
Figure 23C:
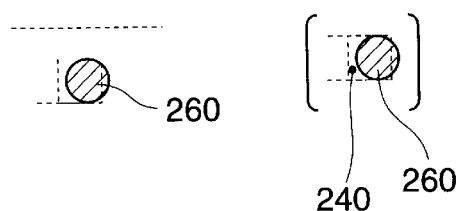

FIG. 23 illustrates the layout in the eighth embodiment. As shown in FIG. 23, in this eighth embodiment, the light emitting elements 24 are arranged toward the end face on which the reflective layer 2 of the projected face is disposed, and the light receiving elements 26 are arranged in the plus direction of the Y axis in the diagram.

Next will be described the effects of the layout in the seventh embodiment with reference to simulation results illustrated in FIG. 24.

Figure 24:
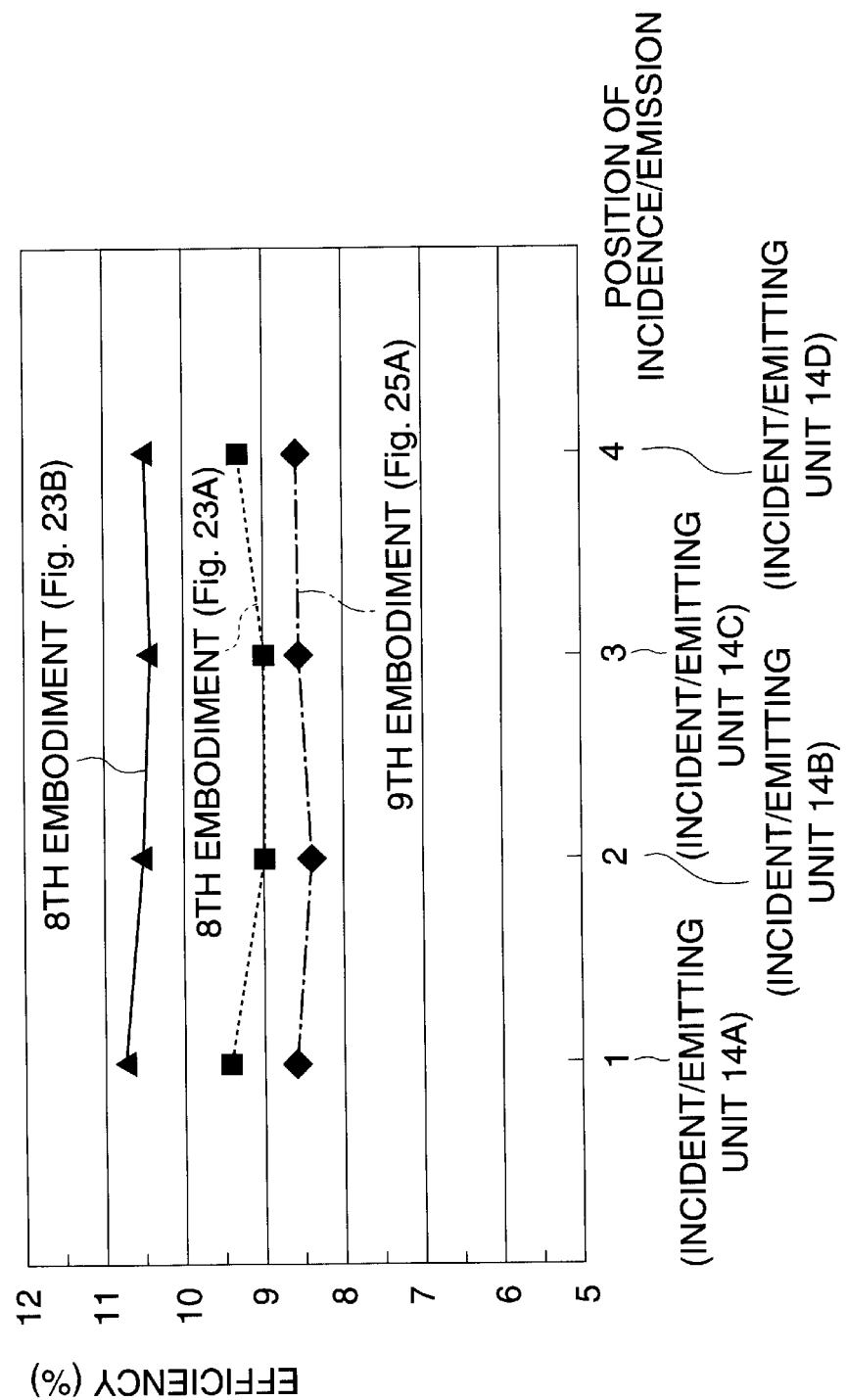
FIG. 24 illustrates the result of simulation of the light receiving efficiencies of optical signal transmitting apparatuses in the seventh and an eighth modes of carrying out the invention.
Figure 25A:
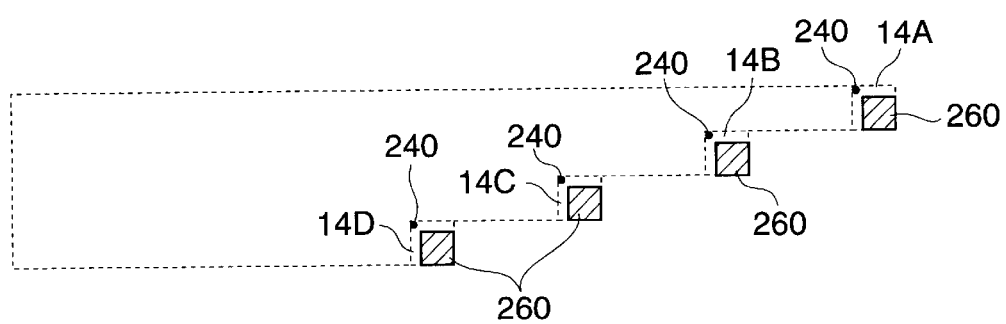
FIG. 25 illustrates a layout of an optical signal transmitting apparatus in the eighth embodiment of the invention.
Figure 25B:
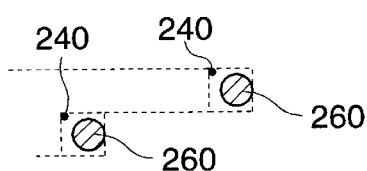

FIG. 24 shows the simulated comparison of the quantities of light received in the eighth embodiment (the layout shown in FIGS. 9A and 9B). As is evident from FIG. 24, the layout in the eighth embodiment can serve to raise the utilization efficiency of light. In this FIG. 24, the incidence/emission portions 1, 2, 3 and 4 respectively represent the positions of the incidence/emission portions 4A, 4B, 4C and 4D.

In the eighth embodiment, even if light receiving elements having round light receiving areas 260 are used (the diameter of each light receiving element area 260 is substantially equal to the length of each side of the projected faces of the incidence/emission portions 14), the light receiving elements 26 can provide the same effects.

Furthermore, the form of the light transmitting medium 1 and the size, shape and other factors of the incidence/emission portions 14 need not be the same as indicated in the eighth embodiment, but any other arrangement would be acceptable if, in relative terms, the light emitting areas 240 of the light emitting elements 24 are disposed within the projected faces of the incidence/emission portion 14 in the light branching apparatus 10 and outside it (the side contrary to the end face on which the reflective layer 2 is arranged) are disposed the light receiving areas 260 of the light receiving elements 26.

[Ninth Embodiment]

The ninth embodiment of the invention is the same as the eighth embodiment except that all the light receiving areas 240 are arranged within the projected faces of the incidence/emission portions 14. FIG. 24 shows the result of simulation of the quantities of light received. Although the utilization efficiency is lower than in the eighth embodiment, the distribution of the quantities of light received is substantially uniform, not significantly varying among the individual incidence units.

In the eighth and ninth modes of implementation, the utilization efficiency of light can be enhanced by arranging a light emitting part and a light receiving part within the projected faces in the direction of incidence on or emission from the incidence/emission portions.

Furthermore, uniform branching of the incident signal light is possible, and so is the uniformization of the output levels of light in the emission units.

As hitherto described, the present invention involves no complexity of hardware configuration in structuring an apparatus for transmitting optical signals through plural light incidence/emission portions, even if there is a number of incidence/emission portions.

[Tenth Embodiment]

From first to 9th embodiment, the projecting/receiving elements installed on a circuit boards are shown as the incident/emission bodies. Here is other embodiment which the optical signal transmitting apparatus transmits to and/or receives from external devices such as an image scanner, except a circuit board.

Figure 26:
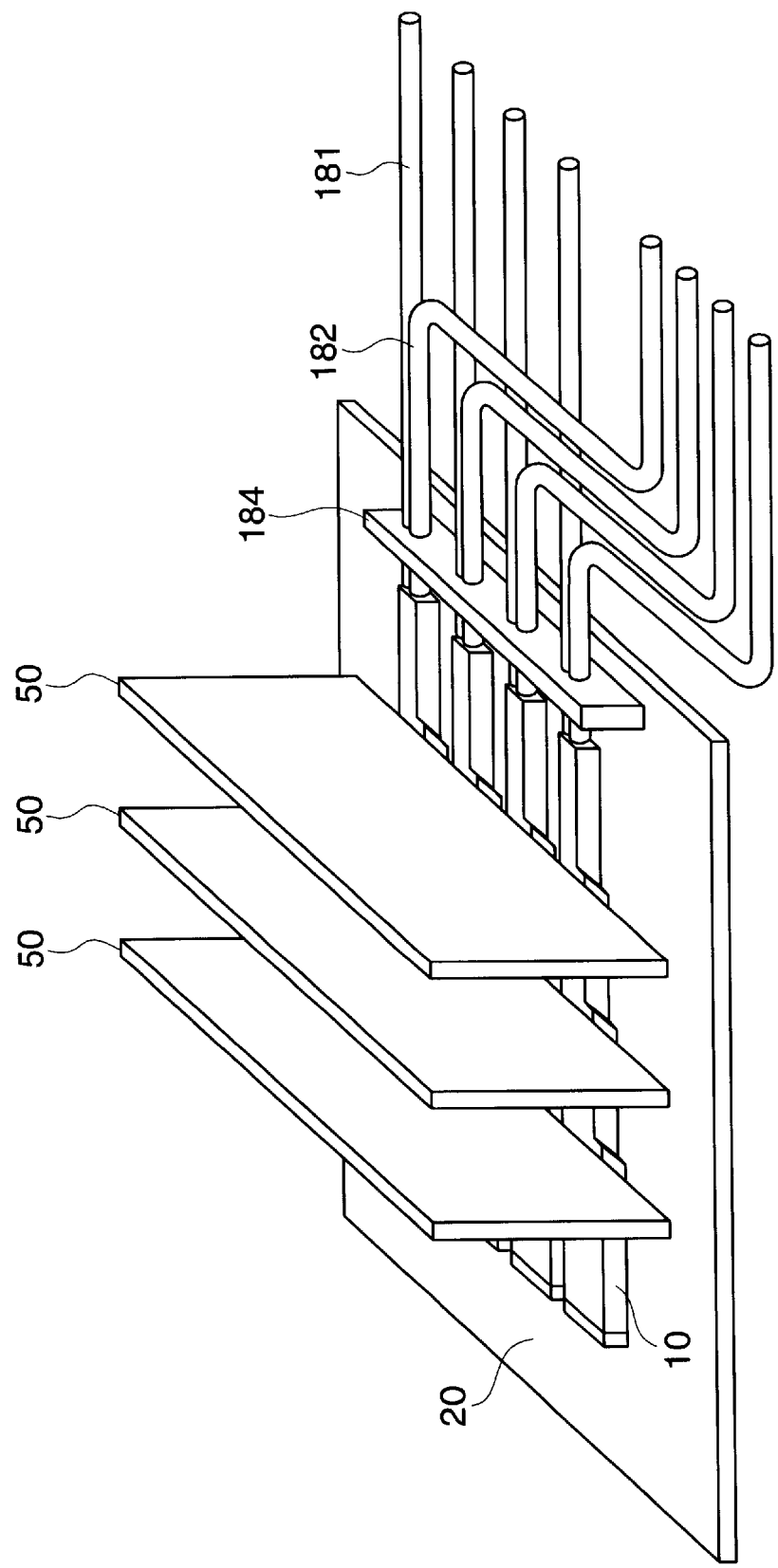
FIG. 26 illustrates a layout of an signal processing apparatus in the ninth embodiment of the invention.

FIG. 26 illustrates the arrangement of a signal processing apparatus of this embodiment. Plurality of the optical signal transmitting apparatuses (four in this embodiment) on a supporting board 20 are installed being paralleled to each other. Each of one side of the optical signal transmitting apparatus 10 includes incidence/emission portions corresponding to the steps of the stepwise form.

Figure 27:
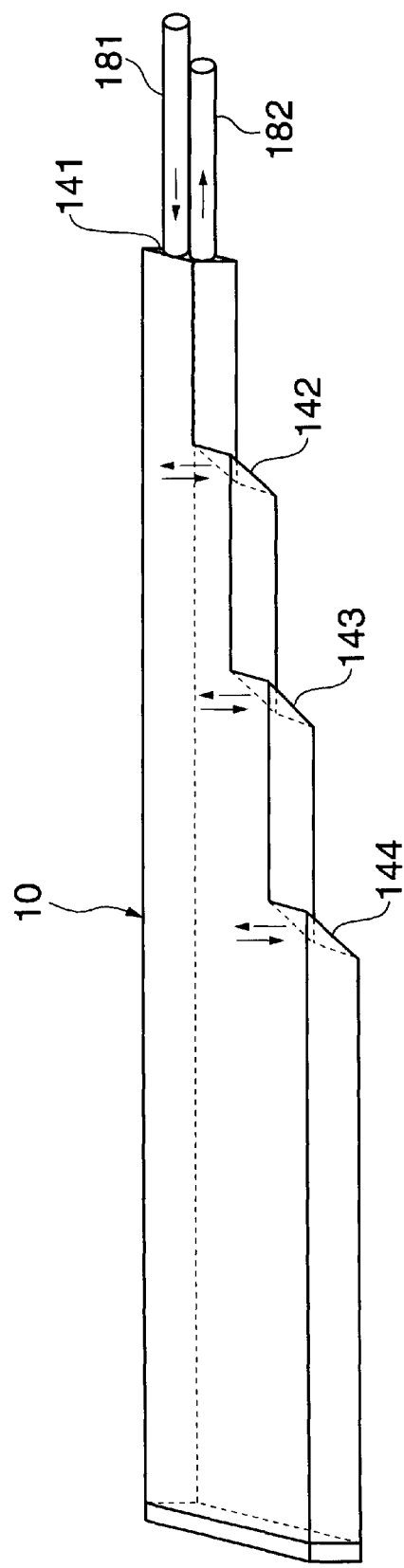
FIG. 27 illustrates the connection of the optical signal transmitting apparatus and the optical fibers in the ninth embodiment of the invention.

FIG. 27 illustrates the sheet-like optical signal transmitting apparatus 10 shown in FIG. 26. The optical signal transmitting apparatus 10 has the plural stepwise incidence/emission portions 141–144. The surface of the incidence/emission portions 142–144, which is incident or emit the optical signal toward the projecting/receiving elements of the circuit board 50, are inclined 45° to the top of the optical signal transmitting apparatus 10. The edge surface of the incidence/emission portion 141, which is connected to an optical fibers 181,182 to transmit optical signals toward an external device, is perpendicular to the top surface of the optical signal transmitting apparatus 10.

Figure 28:
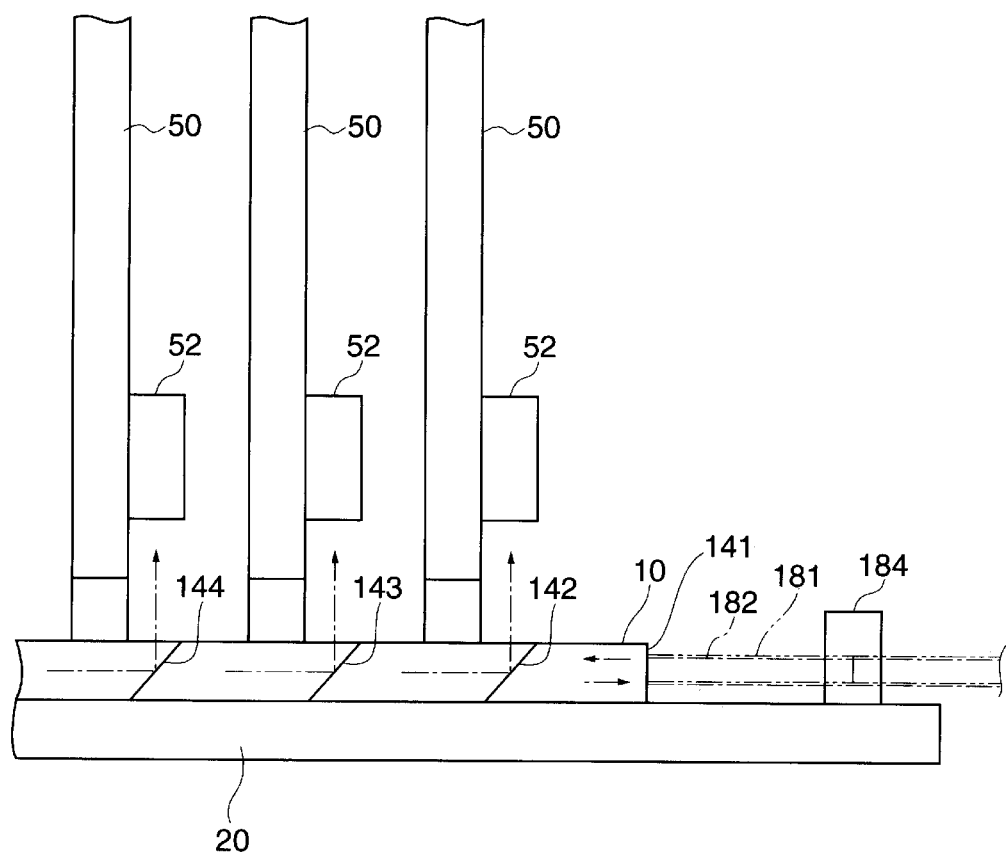
FIG. 28 illustrates the arrangement of the circuit board, the optical signal transmitting apparatus, the connector and optical fibers in the ninth embodiment of the invention.

FIG. 28 illustrates the cross sectional view of the optical signal processing apparatus shown in FIG. 26. On each circuit boards, plural beam projecting elements and photo detectors 52 are installed and disposed to face the incidence/emission portions 142,143,144. The circuit boards 50 are installed so as to be stood side by side above the optical signal transmitting apparatus 10.

At the incidence/emission portion 141, an input optical fiber 181 and an output optical fiber 182 are connected to transmit optical signals toward an external device. Other edge of the optical fiber 181,182 are connected to a connector 184 fixed on the supporting board 20. Another side of the connector is connected an optical fiber which connects to the external devices.

The optical signal transmit from the external device via the optical fiber 181 is incident on the incidence/emission portions 141 and transmit inside the optical signal transmitting apparatus 10. When the optical signal is incident on incidence/emission portions 142–144, the optical signal is emit from the portion 141 and transmits to the external device through the optical fiber 182. The transmission and propagation of the optical signals being incident on the incidence/emission portions 142–144 are as same as that of other embodiments.

This embodiment proves the optical interconnection between the signal processing apparatus and the external device can be easily operated by using an optical fiber and a connector.

Figure 29:
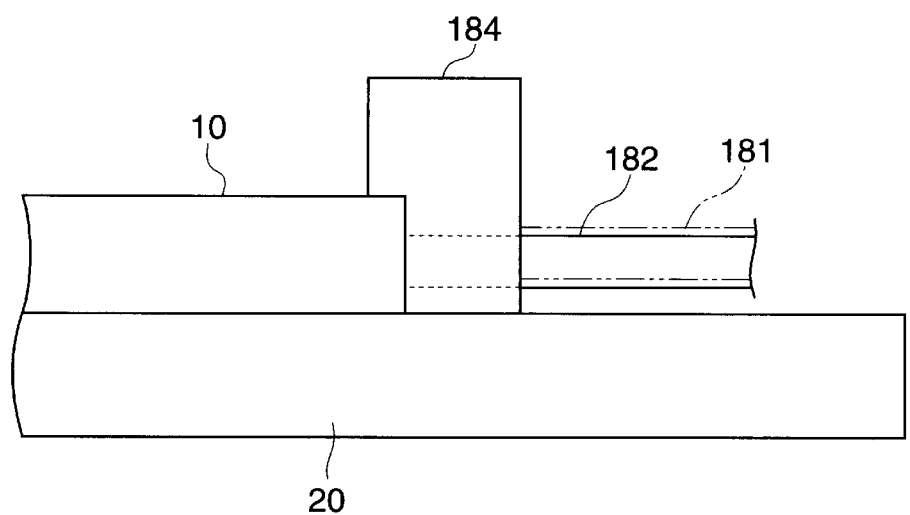
FIG. 29 illustrates a variation of the arrangement of the connector and the optical signal transmitting apparatus in the ninth embodiment of the invention.

The optical fiber connected to the external device may be detachably attached. The connector also may be installed at the incidence/emission portions 141 directly and the optical fiber connected to the external device may be connected only to the connector. (FIG. 29) Though, in above embodiment, the optical fiber is connected only to the incidence/emission portions 141, the optical fiber or fibers may be connected to any incidence/emission portion(s).

Moreover, where not only optical signals coming directly incident on the incidence/emission portions, out of the optical signals reflected by a reflecting part, but also other optical signals reflected by sides of the light transmitting medium are guided to the whole area of the incidence/emission portions, there is the additional advantage of enhancing the utilization efficiency of optical signals.

What is claimed is:

1. An optical signal transmitting apparatus, comprising:
   a light transmitting medium having a plurality of level gaps at one end thereof, the plurality of level gaps corresponding to a plurality of incidence/emission portions on which an optical signal is incident and/or from which the optical signal is emitted; and
   a reflector arranged at the other end of the light transmitting medium, which reflects, toward the plurality of incidence/emission portions, an optical signal incident on the incidence/emission portions and directed toward the reflector at the other end.

2. An optical signal transmitting apparatus according to claim 1, wherein the reflector diffusively reflects the optical signal incident on the incidence/emission portions.

3. An optical signal transmitting apparatus according to claim 1, wherein the reflector is a mirror reflector.

4. An optical signal transmitting apparatus according to claim 1, wherein part of the optical signal reflected by the reflector is directly incident on the plurality of the incidence/emission portions.

5. An optical signal transmitting apparatus according to claim 4, wherein part of the optical signal is reflected by a side of the light transmitting medium to be incident on the plurality of the incidence/emission portions.

6. An optical signal transmitting apparatus according to claim 1, wherein the plural incidence/emission portions are formed by disposing stepwise plural level gaps at the one end of the light transmitting medium.

7. An optical signal transmitting apparatus according to claim 1, wherein the light transmitting medium is in a sheet-like shape and each side of the level gaps of the one end thereof faces the other end side thereof.

8. An optical data bus system, comprising:

an optical signal transmitting apparatus comprising a light transmitting medium having a plurality of level gaps at one end thereof, the plurality of level gaps corresponding to a plurality of incidence/emission portions on which an optical signal is incident and/or from which the optical signal is emitted, and a reflector arranged at the other end of the light transmitting medium, which reflects an optical signal incident on the incidence/emission portions toward the plurality of incidence/emission portions;

a supporting board that supports the optical signal transmitting apparatus; and a connection structure which holds a circuit board including a light emitting/receiving element disposed to face the incidence/emission portions.

9. An optical data bus system according to claim 8, further comprising:

an optical fiber one end of which is connected to the incidence/emission portions and a connector attached to the other end of the optical fiber for connecting an external device.

10. An optical data bus system according to claim 8, further comprising:

a connector attached to the incidence/emission portions for connecting an optical fiber connected to an external device.

11. The optical data bus system of claim 8, wherein the plural incidence/emission portions are formed stepwise, the supporting board has plural connectors, and the optical signal transmitting apparatus and the supporting board are provided so that a line segment defined by the plural incidence/emission portions and a line segment defined by the plural connectors are substantially parallel to each other.

12. A signal processing apparatus, comprising:

an optical signal transmitting apparatus comprising a light transmitting medium having a plurality of level gaps at one end thereof, the plurality of level gaps corresponding to a plurality of incidence/emission portions on which an optical signal is incident and/or from which the optical signal is emitted, and a reflector arranged at the other end of the light transmitting medium, which reflects an optical signal incident on the incidence/emission portions toward the plurality of incidence/emission portions; and a circuit board including at least one light emitting/receiving element which is disposed to face the incidence/emission portions and transmit and/or detect the optical signal.

13. A signal processing apparatus according to claim 12, wherein the circuit board includes both a light emitting element and a light receiving element corresponding to one of the incidence/emission portions.

14. A signal processing apparatus according to claim 13, wherein the light emitting element is arranged closer to the reflector than the light receiving element.

15. A signal processing apparatus according to claim 13, wherein a light detecting area of the light receiving element is substantially equal to or greater than an area of the corresponding incidence/emission portion for emitting the optical signal.

16. A signal processing apparatus according to claim 13, wherein a light detecting area of the light receiving element is greater than an area of the corresponding incidence/emission portion for emitting the optical signal and is slid from a center of the corresponding incidence/emission portion so as to be away from the reflector.

17. A signal transmitting apparatus comprising:

a light transmitting medium having a plurality of level gaps at one end thereof, the plurality of level gaps corresponding to a plurality of incidence/emission portions on which an optical signal is incident and/or from which the optical signal is emitted; and a reflector arranged at the other end of the light transmitting medium, which reflects an optical signal incident on the incidence/emission portions toward the plurality of incidence/emission portions, wherein the optical transmitting apparatus is a first optical signal transmitting apparatus in which the plurality of incidence/emission portions are formed stepwise, and further comprising:

a supporting board that supports the first optical signal transmitting apparatus and has plural connectors, wherein the optical signal transmitting apparatus and the supporting board are provided so that a line segment defined by the plural incidence/emission portions and a line segment defined by the plural connectors are substantially parallel to each other.

* * * * *